US010415773B2

(12) United States Patent
Oksengendler et al.

(10) Patent No.: US 10,415,773 B2
(45) Date of Patent: Sep. 17, 2019

(54) ELONGATED SOLID STATE LIGHT SOURCE HOLDER FOR RETROFITTING LUMINAIRES WITH TOMBSTONE SOCKETS

(71) Applicants: Alex Oksengendler, Buffalo Grove, IL (US); Ty Vyn Rock, Beverly, MA (US)

(72) Inventors: Alex Oksengendler, Buffalo Grove, IL (US); Ty Vyn Rock, Beverly, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 964 days.

(21) Appl. No.: 14/723,287

(22) Filed: May 27, 2015

(65) Prior Publication Data

US 2015/0345751 A1 Dec. 3, 2015

Related U.S. Application Data

(60) Provisional application No. 62/003,220, filed on May 27, 2014, provisional application No. 62/062,145, filed on Oct. 9, 2014, provisional application No. 62/004,556, filed on May 29, 2014.

(51) Int. Cl.
| F21K 9/27 | (2016.01) |
| F21S 4/28 | (2016.01) |
| F21Y 103/10 | (2016.01) |
| F21Y 115/10 | (2016.01) |

(52) U.S. Cl.
CPC .............. *F21S 4/28* (2016.01); *F21Y 2103/10* (2016.08); *F21Y 2115/10* (2016.08); *Y02B 20/386* (2013.01)

(58) Field of Classification Search
CPC .... F21V 2103/00; F21V 19/08; F21V 14/107; F21V 21/005; F21S 8/02; F21Y 2101/02; F21K 9/27; F21K 9/272; F21K 9/275; F21K 9/278
USPC ... 362/226, 217.1, 217.11, 217.17, 221, 225, 362/217.13
See application file for complete search history.

(56) References Cited

U.S. PATENT DOCUMENTS

| 2,503,876 | A | * | 4/1950 | Krauss | .................... E06B 9/388 |
| | | | | | 138/106 |
| 3,349,237 | A | * | 10/1967 | Jackson | ................ F21V 21/005 |
| | | | | | 362/219 |
| 4,130,860 | A | * | 12/1978 | Careglio | ................. F21S 8/031 |
| | | | | | 362/217.08 |
| 5,440,466 | A | * | 8/1995 | Belisle | .................... F21V 17/18 |
| | | | | | 362/221 |
| 6,033,088 | A | * | 3/2000 | Contigiani | ............ F21V 17/007 |
| | | | | | 362/249.14 |
| 6,179,452 | B1 | * | 1/2001 | Dunning | ................... F21S 4/20 |
| | | | | | 362/223 |
| 6,210,019 | B1 | * | 4/2001 | Weathers | .................. F21S 8/04 |
| | | | | | 362/220 |
| 6,739,734 | B1 | * | 5/2004 | Hulgan | ..................... F21S 8/02 |
| | | | | | 362/217.05 |

(Continued)

*Primary Examiner* — Ismael Negron
(74) *Attorney, Agent, or Firm* — Edward S. Podszus

(57) ABSTRACT

A retrofit system includes an elongated holder having a solid state light engine, a cavity configured to receive a power supply for the light engine, and a receptacle configured to receive a tombstone socket of an existing luminaire, such that the light engine is positioned and aligned substantially in the same place as a fluorescent lamp being replaced by the retrofit system within the luminaire.

32 Claims, 18 Drawing Sheets

(56) References Cited

U.S. PATENT DOCUMENTS

| | | | | |
|---|---|---|---|---|
| 7,036,955 B2* | 5/2006 | Kazi | ..................... | F21V 15/01 |
| | | | | 362/219 |
| 7,066,618 B1* | 6/2006 | Little | ..................... | F21V 21/08 |
| | | | | 248/227.4 |
| 7,267,461 B2 | 9/2007 | Kan et al. | | |
| 8,092,038 B2* | 1/2012 | Liao | ..................... | F21V 19/004 |
| | | | | 362/217.1 |
| 8,104,920 B2* | 1/2012 | Dubord | .................. | F21S 2/005 |
| | | | | 362/217.12 |
| 8,109,647 B2* | 2/2012 | Soo | ......................... | F21S 8/02 |
| | | | | 362/217.03 |
| 8,272,763 B1* | 9/2012 | Chinnam | ............. | F21V 29/004 |
| | | | | 362/147 |
| 8,531,109 B2* | 9/2013 | Visser | .................... | F21V 25/04 |
| | | | | 315/294 |
| 8,791,650 B2* | 7/2014 | Shan | ................. | H05B 33/0803 |
| | | | | 315/185 S |
| 8,888,316 B2* | 11/2014 | Handsaker | ............ | F21V 13/02 |
| | | | | 362/217.01 |
| 9,080,731 B2* | 7/2015 | Janjua | ..................... | F21S 8/02 |
| 9,506,631 B2* | 11/2016 | Erhard | .................... | F21V 17/16 |
| 2015/0276137 A1* | 10/2015 | Demuynck | ............. | F21K 9/175 |
| | | | | 362/218 |

* cited by examiner

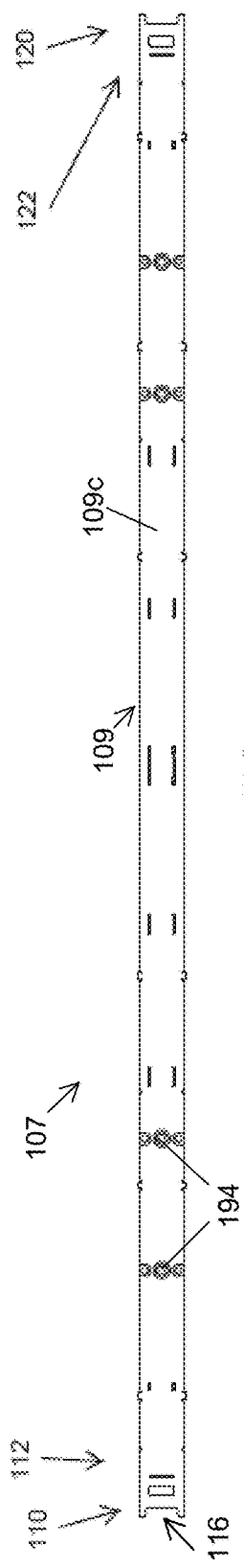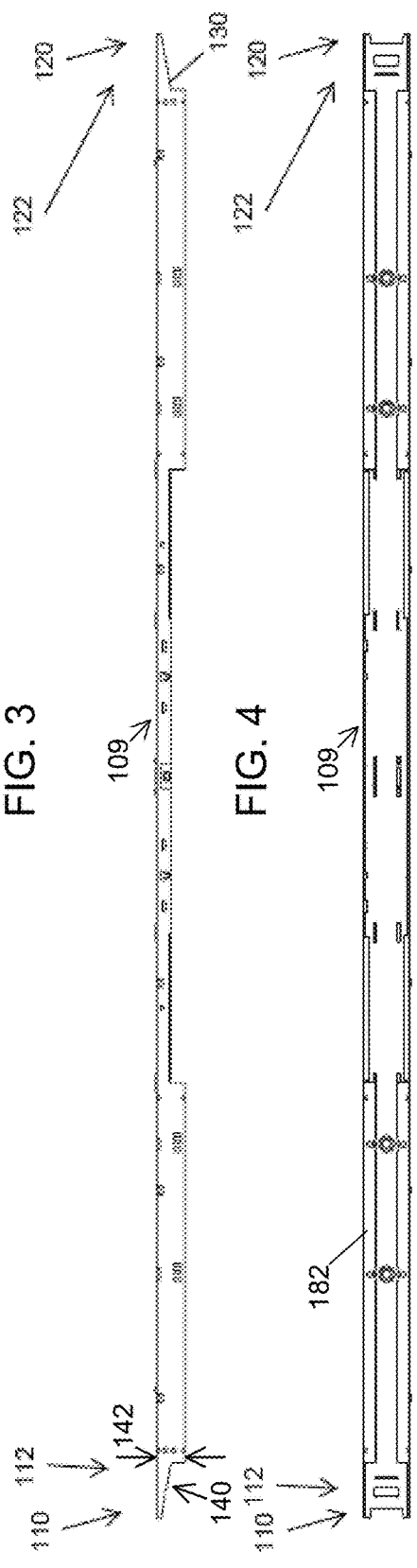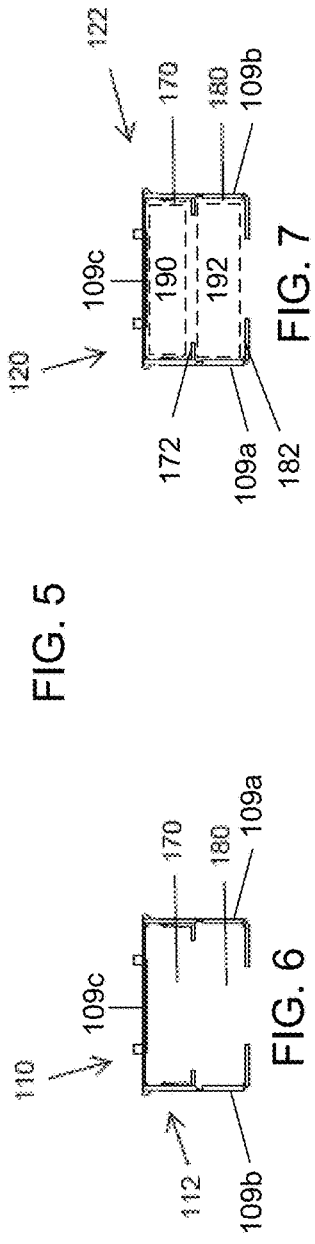

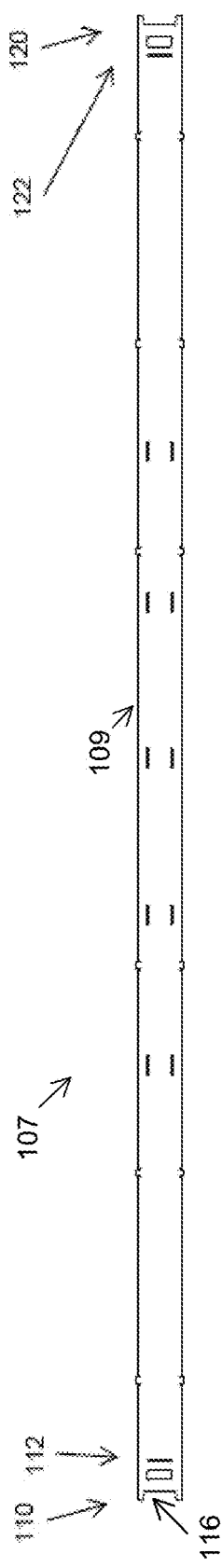
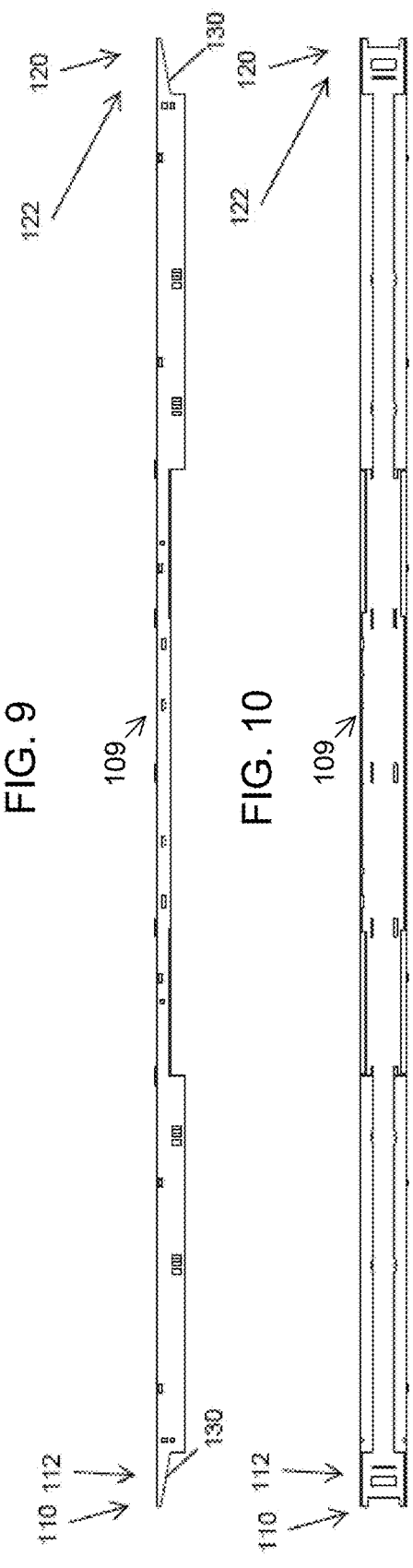
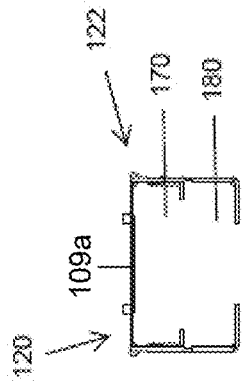
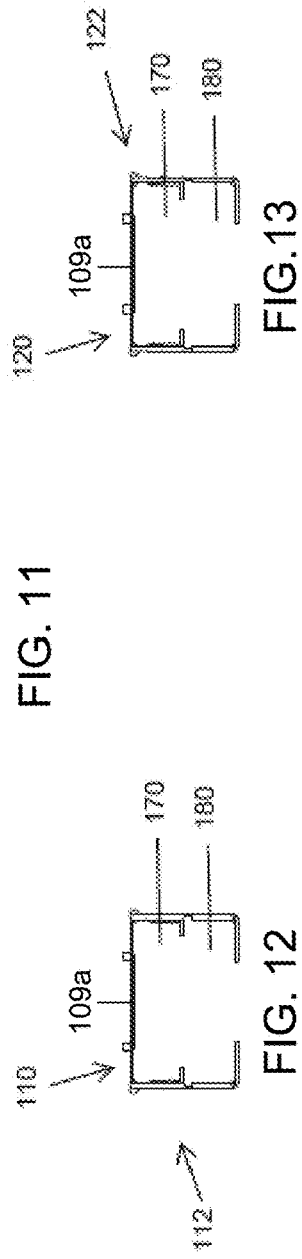
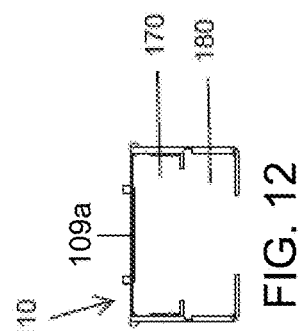

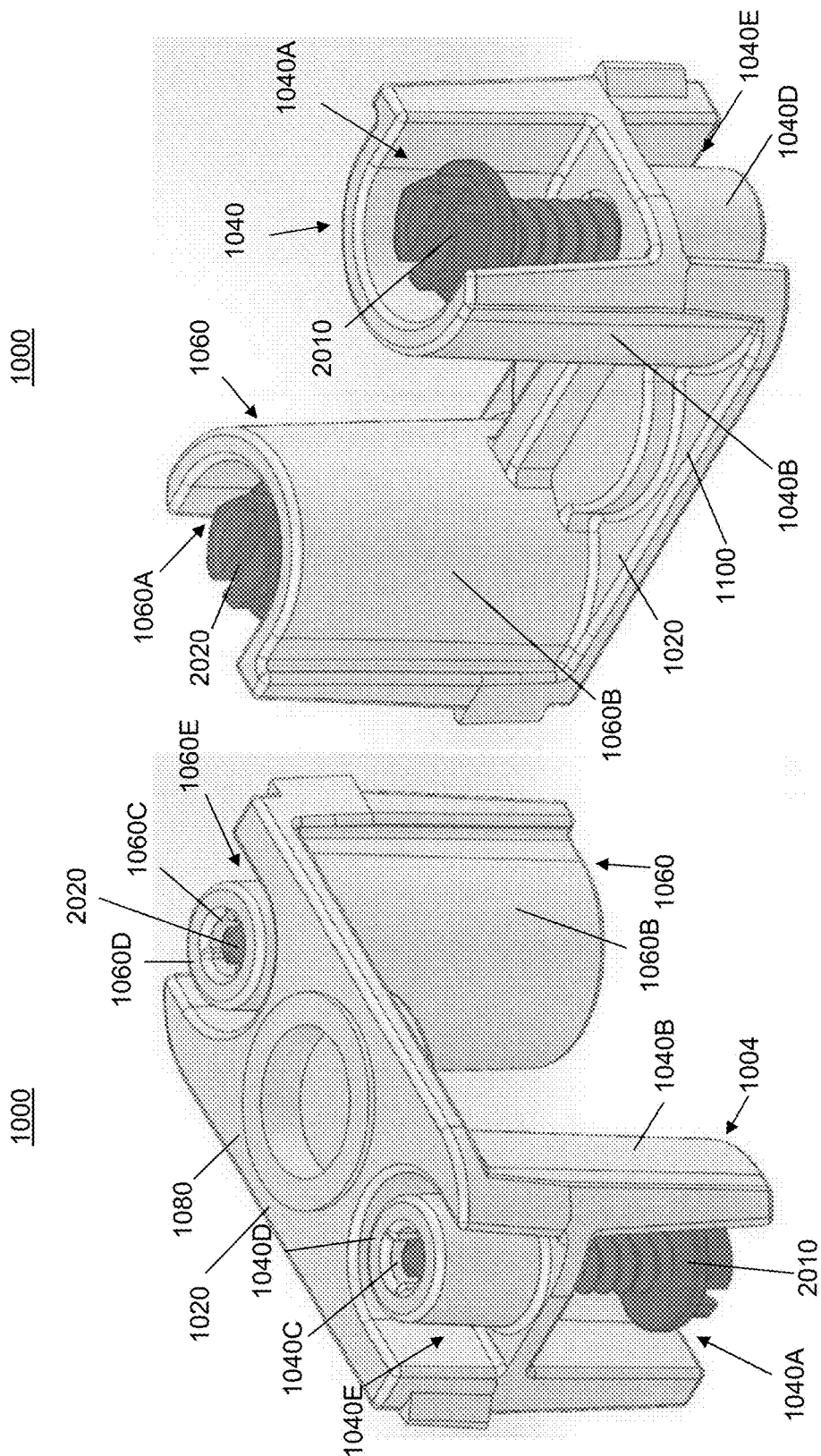

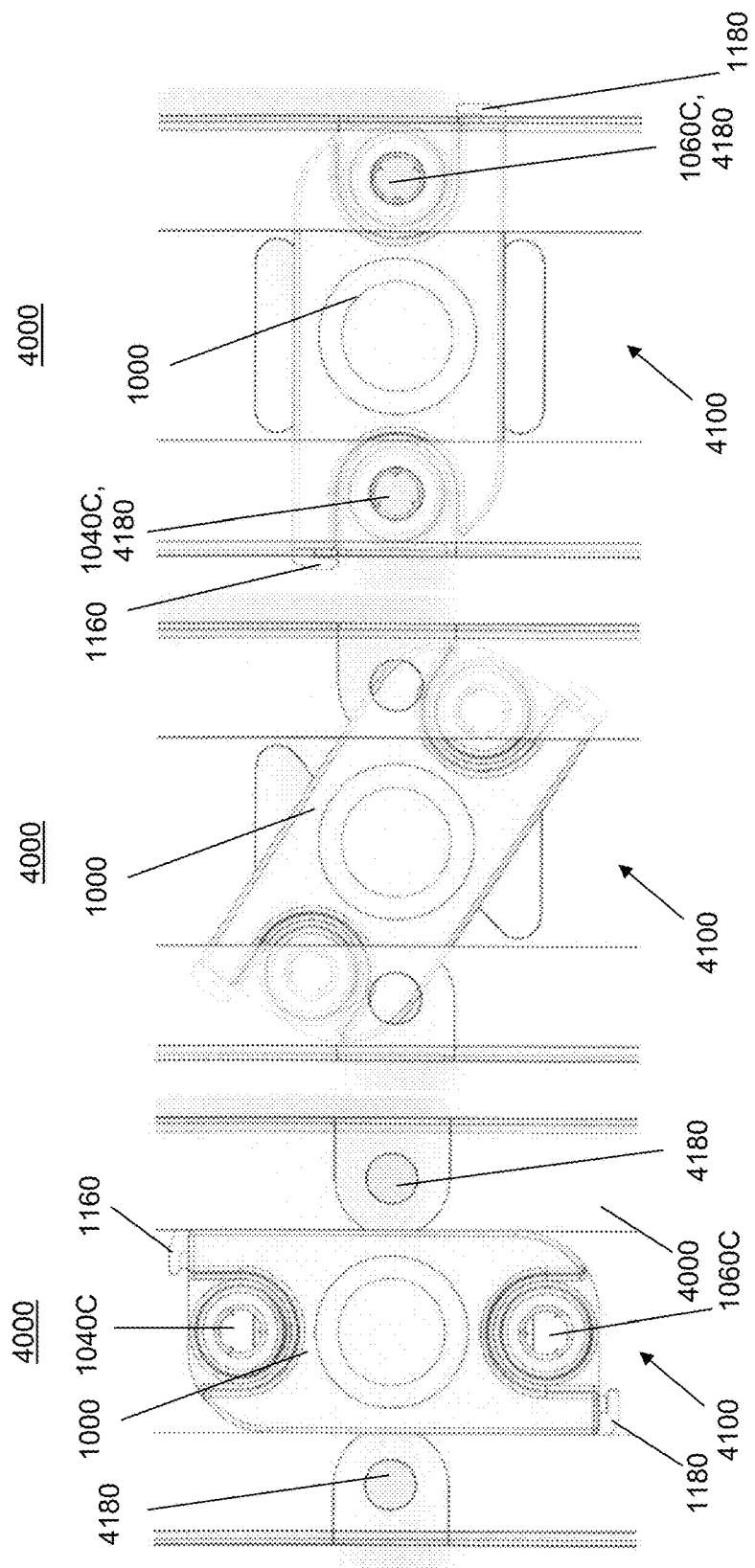

ELONGATED SOLID STATE LIGHT SOURCE HOLDER FOR RETROFITTING LUMINAIRES WITH TOMBSTONE SOCKETS

CROSS-REFERENCE TO RELATED APPLICATIONS

The present application claims priority of U.S. Provisional Patent Application No. 62/003,220, entitled "SELF ALIGNING INTEGRATED HOLDER" and filed May 27, 2014, U.S. Provisional Patent Application No. 62/062,145, entitled "PAN-BASED INTEGRATED LIGHT ENGINE" and filed Oct. 9, 2014, and U.S. Provisional Patent Application No. 62/004,556, entitled "SUPPORT MOUNT" and filed May 29, 2014, the entire contents of all of which are hereby incorporated by reference.

TECHNICAL FIELD

The present invention relates to lighting, and more specifically, to luminaires including light sources.

BACKGROUND

A typical fluorescent lamp socket for a tubular bi-pin lamp is commonly referred to as a tombstone socket or simply a tombstone. The tombstone socket is adapted to receive one or more pins traditionally located on the end caps of a tubular fluorescent lamp, whether a straight tube, a bent tube, or other type. The tombstone provides electricity to the fluorescent lamp as well as mechanical support for the fluorescent lamp. A tombstone is sometimes a removable part of a larger system (e.g., fluorescent lamp fixture/luminaire, display case, refrigeration case, etc.) and is sometimes integral with the larger system.

In order to reduce power consumption and increase durability, many fluorescent lamps are being replaced by lamps including one or more solid state light sources (such as but not limited to light emitting diodes (LEDs), organic light emitting diodes (OLEDs), polymer light emitting diodes (PLEDs), organic light emitting compounds (OLECs), and the like). These new lamps mimic the shape and size of conventional fluorescent lamps, and some even operate on the same ballast as a conventional fluorescent lamp.

SUMMARY

Tubular-style lamps that include solid state light sources but mimic the shape and size of conventional fluorescent lamps are not always an ideal solution to replace conventional fluorescent lamps. New lamps including solid state light sources that are able to run off an existing fluorescent ballast do not require removal of the existing fluorescent ballast or rewiring of the fixture in which the lamps are placed, at least upon installation. This should result in cost savings due to lessened time and labor, and makes for an easier installation, as an electrician is not required. However, though the existing fluorescent ballast does not need to be replaced upon installation of the new lamp(s), it is possible that the new lamp(s) will outlive the existing fluorescent ballast, given the expected long lifetimes of solid state light sources. Thus, in such situations, replacement of the existing fluorescent ballast will likely be necessary in order to ensure continued operation of the new lamp over its lifetime. Thus, the cost savings realized by using a new lamp may not be cost savings as much as they are pushing a known cost off into the future, when it may be more expensive than it is today. Further, such new lamp(s) tend to be more expensive, due to the included electronics that allow operation from a conventional fluorescent ballast.

Using a tubular-style lamp that includes solid state light sources but does not operate from a conventional fluorescent ballast may result in a less expensive product, and does not shift costs into the future. Indeed, in some situations, such an installation may be required, depending on the age and/or type of the existing fluorescent ballast. However, such new lamp(s) with require re-wiring of the fixture to remove the existing ballast. It is then either replaced with a driver for the new lamp(s) or is wired such that AC line power is run directly to the tombstone socket. Such arrangements may be dangerous to future users, who may not install the right type of lamp into the fixture, and may void the fixture manufacturer's warranty. Similarly, the fixture may not accommodate the driver for the new lamp(s), as the driver may have a different profile than the fluorescent ballast for which the fixture was designed. This may require modifying the fixture, which results in increased costs and again may void the fixture manufacturer's warranty. It may also prohibit later replacement with a different driver, lessening the fixture's expected lifetime.

In some applications, replacing conventional fluorescent lamps with a solid state light source-based lighting device requires using metal snap brackets that need to be fastened to a stationary object using screws, or by removing the existing tombstone sockets and replacing them with a particular part designed for that particular device. This is time-consuming and costly. The costs, in terms of time and money, are increased in situations where the tombstone sockets were not designed to be removed from the existing fixture or installation, such as when one or more tombstones are flush with an interior wall of the fixture, or built into the wall.

Embodiments overcome these and other deficiencies by providing a retrofit system for a luminaire that uses solid state light sources, while occupying the existing space of one or more conventional fluorescent lamps. The retrofit system includes an integrated holder for one or more drivers for the solid state light sources, and interfaces with the fixture so as to fit around the existing tombstone sockets. Embodiments include an integrated holder (that is, a holder configured to hold both of at least one solid state light source-based light engine and at least one power supply or driver to power the solid state light engine) that is capable of occupying and configured to occupy the same space as a tubular fluorescent lamp without having to adapt or remove the tombstone(s) to accommodate the holder. Embodiments also include, on at least one side of the integrated holder, a tombstone socket receptacle, which may be formed at least in part by two protrusions extending out from the integrated holder that surround each side of the tombstone, and are spaced such that the integrated holder is flush or substantially flush or nearly flush with the face of the tombstone where one or more pins from a fluorescent lamp would typically go.

In an embodiment, there is provided a retrofit system for a luminaire including a tombstone socket. The retrofit system includes an integrated holder configured to hold a solid state light engine and a power supply to power the solid state light engine and a tombstone socket receptacle configured to interface with the tombstone socket of the luminaire.

In a related embodiment, the integrated holder may include opposing first and second longitudinal distal ends, and the tombstone socket receptacle may be located at the first longitudinal distal end of the integrated holder. In a further related embodiment, the tombstone socket receptacle may include two protrusions located at the first longitudinal distal end of the integrated holder, the two protrusions may be shaped so as to accommodate the tombstone socket of the luminaire. In another further related embodiment, the tombstone socket receptacle may include a plurality of tombstone socket receptacles. In a further related embodiment, at least two tombstone socket receptacles of the plurality of tombstone socket receptacles may be located at the first longitudinal distal end of the integrated holder. In another further related embodiment, a tombstone socket receptacle of the plurality of tombstone socket receptacles may be located at the second longitudinal distal end of the integrated holder. In a further related embodiment, at least two tombstone socket receptacles of the plurality of tombstone socket receptacles may be located at the second longitudinal distal end of the integrated holder.

In another related embodiment, the integrated holder may include an elongated structure. In a further related embodiment, the integrated holder may include opposing first and second longitudinal distal ends, the opposing first and second longitudinal distal ends may be on opposing ends of the elongated structure, and the tombstone socket receptacle may be located at the first longitudinal distal end. In another further related embodiment, the retrofit system may further include a light engine including an elongated shape and a plurality of solid state light sources arranged thereon, the light engine may be fastened to the elongated structure of the integrated holder such that the elongated shape of the light engine corresponds to the elongated structure of the integrated holder. In yet another further related embodiment, the elongated structure may include a three-dimensional profile extending along a longitudinal length of the elongated structure, the three-dimensional profile may define a cavity in the elongated structure, and the cavity may hold a power supply. In still another further related embodiment, the integrated holder may include opposing first and second longitudinal distal ends; and the elongated structure may include: a three-dimensional profile extending along a longitudinal length of the elongated structure; two laterally spaced sides walls, each comprising a longitudinal distal end portion adjacent at least one of the first longitudinal distal end and the second longitudinal distal end of the elongated structure and defining a notch in the side wall; and a front wall disposed between the two laterally spaced side walls. In a further related embodiment, each side wall may have a height, and each notch may be defined by a decrease is a height of the side wall relative to an adjacent medial portion of each side wall. In another further related embodiment, the three-dimensional profile may include a U-shaped profile. In still another further embodiment, a longitudinal distal end portion of at least one side wall adjacent at least one of the first longitudinal distal end and the second longitudinal distal end of the elongated structure may define a hook. In a further related embodiment, the hook may be configured to hook the retrofit system to the luminaire and to suspend the retrofit system in a vertically hanging position from the luminaire during installation of the retrofit system to the luminaire. In another further related embodiment, the hook may be in the form of a J-hook.

In still another related embodiment, the retrofit system may further include a plurality of light engines, each comprising an elongated shape and a plurality of solid state light sources arranged thereon, and the integrated holder may include a plurality of elongated structures and each one of the plurality of solid state light engines may be arranged on a different one of the plurality of elongated structures. In a further related embodiment, the plurality of elongated structures may be spaced side-by-side by an elongated gap that separates the plurality of elongated structures from each other.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 3 shows a top view of the retrofit system of FIG. 2 according to embodiments disclosed herein.

FIG. 4 shows a side view of the retrofit system of FIG. 2 according to embodiments disclosed herein.

FIG. 5 shows a bottom view of the retrofit system of FIG. 2 according to embodiments disclosed herein.

FIG. 6 shows a first (front) end view of the retrofit system of FIG. 2 according to embodiments disclosed herein.

FIG. 7 shows a second (back) end view of the retrofit system of FIG. 2 according to embodiments disclosed herein.

FIGS. 8-13 shows various views of a retrofit system according to embodiments disclosed herein.

FIGS. 19A and 19B show a support mount include attachments devices according to embodiments disclosed herein.

FIGS. 21A-21C show the support mount of FIG. 18 being placed into a portion of the retrofit system of FIGS. 1-13, according to embodiments disclosed herein.

DETAILED DESCRIPTION

Figure 1:
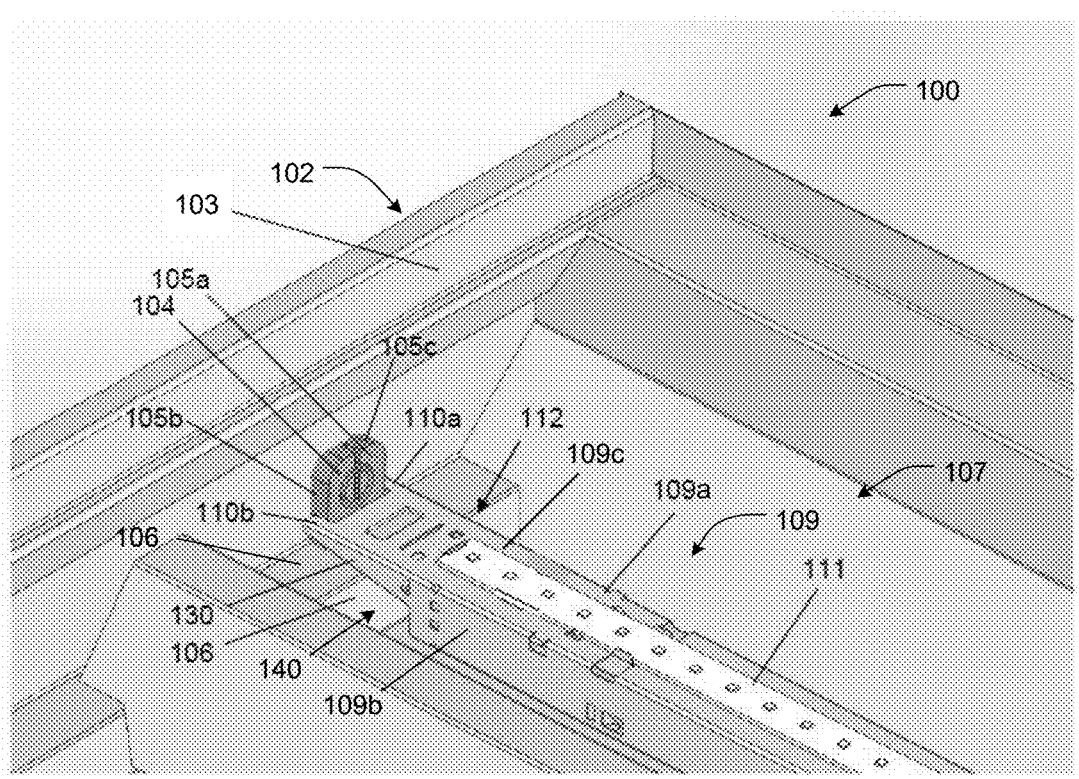
FIG. 1 shows a perspective view of a lighting system including a portion of a luminaire and a portion of a retrofit system for the luminaire configured to hold at least one solid state light engine and at least one power supply according to embodiments disclosed herein.

FIG. 1 shows a lighting system 100, and more particularly a retrofit system 107 for a luminaire 102. The retrofit system 107 is configured to couple with the luminaire 102 having at least one tombstone socket 104 for a tubular bi-pin fluorescent bulb. In some embodiments, the retrofit system 107 is configured to couple with a luminaire 102 having a plurality of tombstone sockets 104 for a plurality of tubular bi-pin fluorescent bulbs. Only a portion of the luminaire 102 and the retrofit system 107 are shown, so as to enlarge the relevant details for easier viewing.

The luminaire 102 includes a fluorescent lamp fixture 103 having at least one tombstone socket 104. The tombstone socket 104 may, and in some embodiments does, have a corresponding tombstone socket 104 on an opposite side of the fluorescent lamp fixture 103 of the luminaire 102 (not shown in FIG. 1). The tombstone socket 104 has a particular width, as measured across a face 105a of the tombstone socket 104, along with a particular depth, as measured across sides 105b, 105c of the tombstone socket 104. For ease of description and understanding, the face 105a of the tombstone socket 104 is understood to be that part of the tombstone socket 104 that would receive one or more pins (or other attachment mechanism(s)) of a fluorescent lamp, while the sides 105b, 105c of the tombstone socket 104 are that portion of the tombstone socket 104 that are perpendicular to plane including the face 105a. Tombstone sockets 104, as known in the art, vary in width and depth, but all generally are within certain sizes. Embodiments are able to accommodate any size of tombstone socket.

As best shown by FIGS. 2-7, the retrofit system 107, in some embodiments, is in the form of an integrated holder 109, having an elongated structure, and including first and second opposing longitudinal distal ends 108. Though FIG. 1 shows a light engine 111 attached to the retrofit system 107, in FIGS. 2-7, the light engine 111 has been removed for clarity. The retrofit system 107 also includes a tombstone receptacle 116, as described in greater detail below.

In some embodiments, the retrofit system 107, and more particularly the integrated holder 109, comprises a three-dimensional profile, and more particularly a U-shaped three-dimensional profile, which extends along a longitudinal length of the integrated holder 109. As explained in greater detail below, the three-dimensional profile forms a cavity in the integrated holder 109 to contain at least one power supply or driver (not shown) for the light engine 111 attached to the integrated holder 107. In some embodiments, the retrofit system 107, and more particularly the integrated holder 109, is formed from sheet metal.

The U-shaped profile of the integrated holder 109 is formed by a front wall 109c disposed between two laterally spaced side walls 109a, 109b. As shown, the front wall 109c and the side walls 109a, 109b are substantially planar, with the side walls 109a, 109b arranged substantially transverse (perpendicular) to the front wall 109c (e.g. within plus (+) or minus (−) 10 degrees of being transverse). When the retrofit system 107 is mounted for use, it may be understood that front wall 109c is arranged substantially horizontal (e.g. within plus (+) or minus (−) 10 degrees of being horizontal) with the side walls 109a, 109b arranged substantially vertical (e.g. within plus (+) or minus (−) 10 degrees of being vertical).

The retrofit system 107, and more particularly the integrated holder 109, includes a first set of protrusions 110, which comprise a first protrusion 110a and a second protrusion 110b, and are formed at least in part by front wall 109c. The first protrusion 110a and the second protrusion 110b extend out from a first end portion 112 of the integrated holder 109. The first protrusion 110a and the second protrusion 110b form the tombstone socket receptacle 116 in the form of a rectangular notch configured to at least partially surround the tombstone socket 104, and more particularly to surround the face 105a and the sides 105b, 105c of the tombstone socket 104 of the fixture 103 of the luminaire 102. As shown, the tombstone socket receptacle 116 is defined on three sides by the front wall 109c of the integrated holder 109. More particularly, each protrusion 110a, 110b has a length which may be, and in some embodiments is, equal to and/or substantially equal to the length of the thickness of the sides 105b, 105c of the tombstone socket 104, and thus at least partially encapsulates the tombstone socket 104. The width of the tombstone receptacle 116 between the protrusions 110a, 110b may be, and in some embodiments is, equal to and/or substantially equal to the length of the width of the face 105a of the tombstone socket 104.

As best shown in FIGS. 2-7, the retrofit system 107, and more particularly the integrated holder 109, in some embodiments, includes two sets of protrusions 110, 120, particularly with a first set 110, including the first protrusion 110a and the second protrusion 110b, on the first end portion 112, and a second set 120, including a first protrusion 120a and the second protrusion 120b (such may also be considered third and fourth protrusions), on a second end portion 122. Working in concert, the two tombstone socket receptacles 116, located at the two opposing ends 108 of the retrofit system 107 and formed between the first set of protrusions 110 and the second set of protrusions 120, align the retrofit system 107, and more particularly the integrated holder 109, between the tombstone sockets 104, such that a light engine 111, including solid state light sources, located on the elongated integrated holder 109, is placed directly and/or substantially directly in the center of the tombstone sockets 104. That is, the light engine 111 fastened to the retrofit system 107 is arranged in the same location and/or substantially the same location as a fluorescent lamp that the retrofit system 107 is replacing. As shown, the light engine 111 comprises an elongated shape with a plurality of solid state light sources mounted thereon, for example to a substrate (e.g. printed circuit board) and arranged along the longitudinal length thereon, and thus along the longitudinal length of the integrated holder 109. As shown, the light engine 111 may be fastened to the integrated holder 109 with tabs integrally formed in the integrated holder 109 and bent over the light engine 111 so as to clamp the light engine 111 between the front wall 109c of the elongated lighting structure 109 and the tab.

With the foregoing arrangement, the retrofit system 107, and more particularly the integrated holder 109, is able to self-align within the fixture 103 of the luminaire 102, with the plurality of tombstone socket receptacles 116 being arranged to each contain a different one of the plurality of tombstone sockets 104 of the luminaire 102. The sets of protrusions 110, 120 also provide mechanical contact with the luminaire 102, depending on the size of the tombstone sockets 104 and/or the length of the protrusions 110, 120 and/or the distance between the protrusions 110, 120, which, in some embodiments, results in an easier installation of the integrated holder 107, and more particularly elongated lighting structure 109, in the luminaire 102.

Referring back to FIG. 1, in some embodiments, the luminaire 102 includes a shelf 106, or other raised portion, on which the tombstone socket 104 is located, as opposed to a bottom of the tombstone socket 104 being flush and/or substantially flush with a bottom interior portion of the luminaire 102, as occurs in some embodiments (not shown in FIG. 1). In such embodiments, the side walls 109a, 109b of the distal end portions 112, 122 of the retrofit system 107, and more particularly the integrated holder 109, as shown in FIG. 1 (among others), each include a notch 140 to accommodate the shelf 106 of the luminaire 102. As shown, a longitudinal distal end portion of each side wall 109a, 109b adjacent at least one of the first and second longitudinal distal ends 108 of the integrated holder 109 defines the notch 140 in each side wall 109a, 109b. As shown, the notch 140 is formed by a narrowing of side walls 109a, 109b of the retrofit system 107, and more particularly the integrated holder 109. More particularly, each side wall 109a, 109b has a height 142 (see FIG. 4), and each notch 140 is defined by a decrease in the height 142 of the side wall 109a, 109b relative to an adjacent medial portion of each side wall 109a, 109b. As shown, the notch 140, in some embodiments, is defined by an angled portion 130 of the side wall 109a, 109b, which may continually narrow along a constant slope as it extends towards distal end 108.

The angled portions 130 create space between the retrofit system 107 and the shelf 106 so that the retrofit system 107 is able to be placed into the fixture 103 of the luminaire 102 containing the shelf 106. The angled portions 130 also provide increased mechanical support to the sets of protrusions 110, 120 on either end 112, 122 of the retrofit system 107. In some embodiments, only one distal end portion 112, 122 and set of protrusions 110, 120 of the integrated holder 107 includes an angled portion 130. In some embodiments, only one protrusion in a set of protrusions includes an angled portion 130. In some embodiments, both protrusions in each set of protrusions include an angled portion 130 (e.g., FIG. 2).

Figure 2:
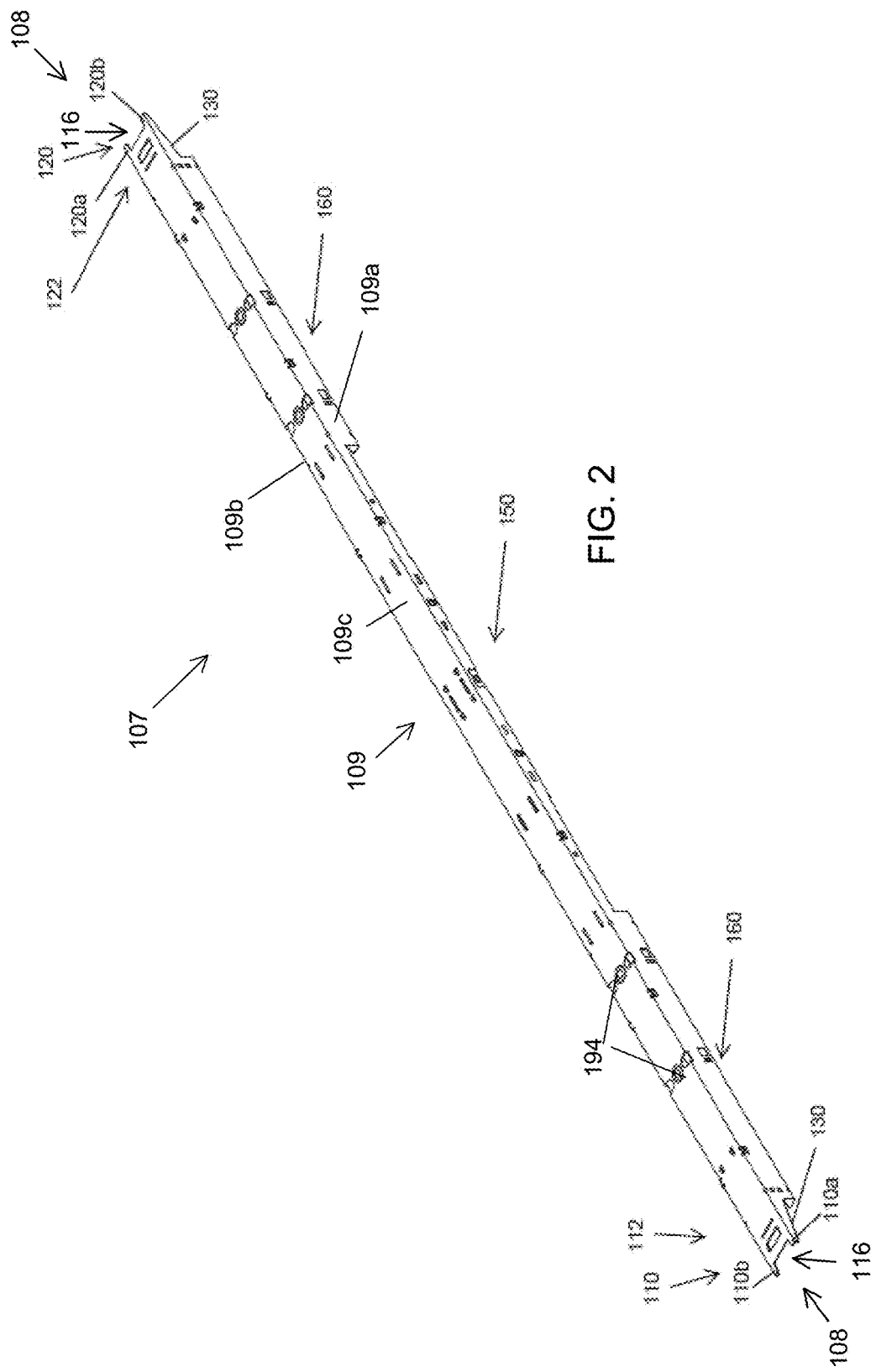
FIG. 2 shows a perspective view of a retrofit system for a luminaire according to embodiments disclosed herein.
Figure 8:
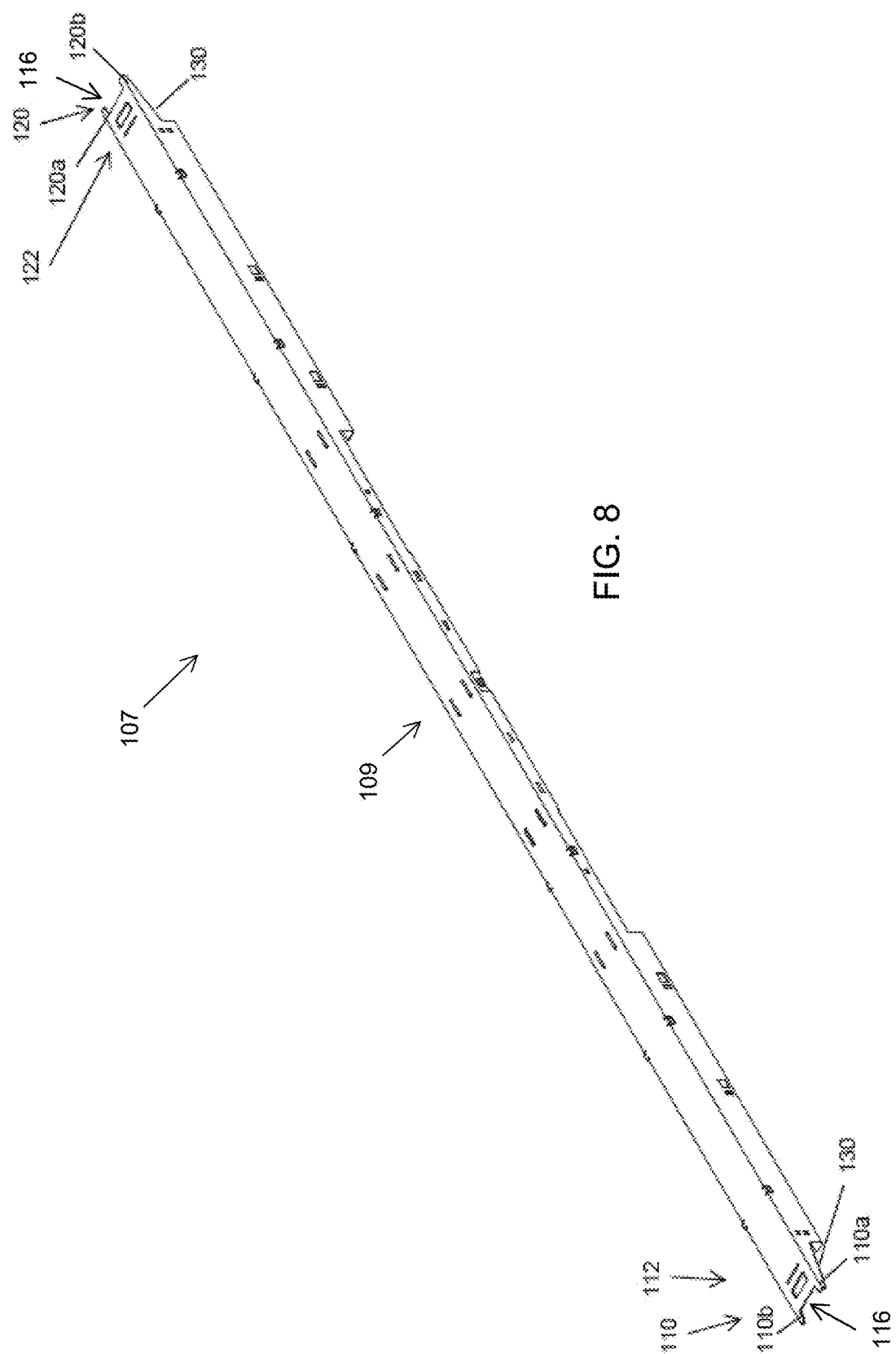
Figure 15:
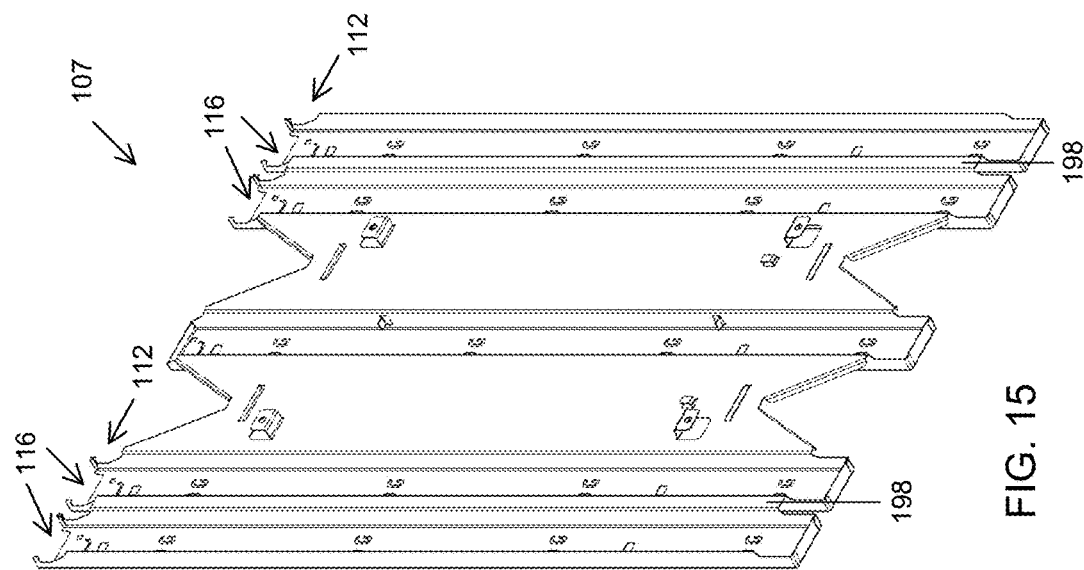
FIG. 15 shows a rear perspective view of the retrofit system of FIG. 14 according to embodiments disclosed herein.
Figure 14:
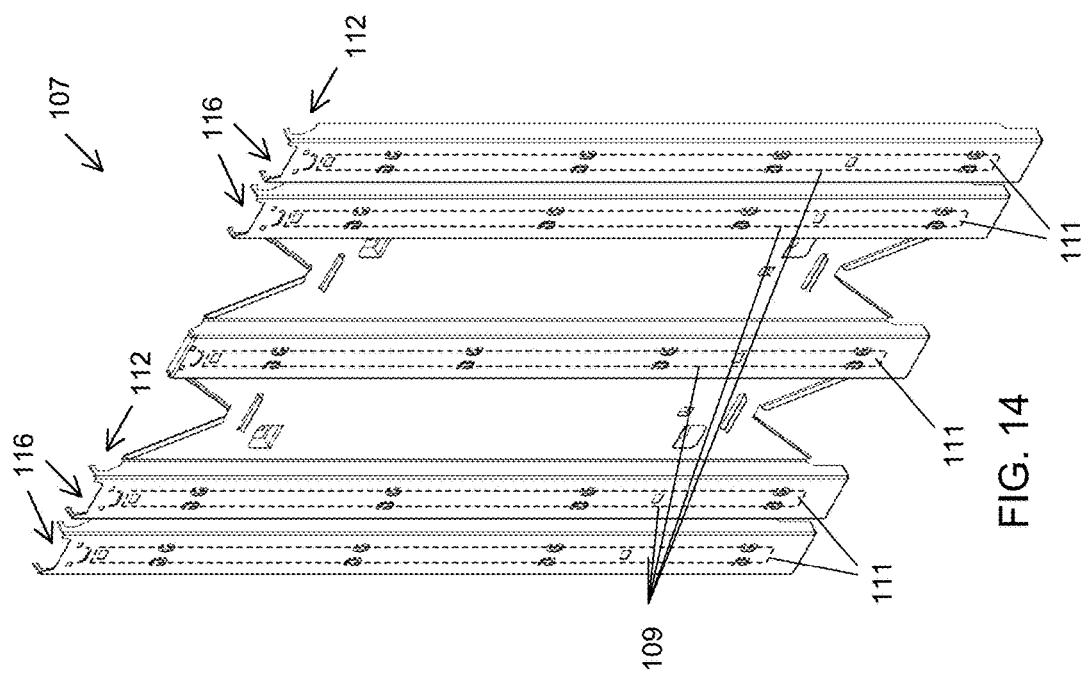
FIG. 14 shows a front perspective view of a retrofit system according to embodiments disclosed herein.

As shown in FIG. 2, the retrofit system 107 includes a thinner intermediate portion 150 and at least one thicker distal end portion 160. As shown best by FIGS. 3-7, the thinner intermediate (medial) portion 150 may be understood to have narrower side walls 109a, 109b that the side walls 109a, 109b of thicker adjacent lateral portion 160. The at least one thicker distal end portion 160 is designed so as to be able to accommodate a driver/power supply and/or control device(s) for a light engine, such as the light engine 111 shown in FIG. 1.

In some embodiments, as shown in, for example, FIGS. 6 and 7, the at least one thicker portion 160 is able to accommodate both a driver/power supply and at least one control device by including a plurality of slotted openings 170, 180. As shown, in FIG. 7, a first driver/power supply is shown in phantom at 190 and a second driver/power supply is shown in phantom at 192.

As shown, to provide the plurality of slotted openings 170, 180 each of the side walls 109a 109b, of the U-shaped profile may further include a one or more inwardly directed flanges/lips 172, 182. As shown, the flange/lip 172 is provided by a separate piece of material added to the side walls 109a, 109b, while the flange/lip 182 is provided by a piece of material formed unitary with side walls 109a, 109b. As shown, the flanges/lips 172, 182, in some embodiments, are arranged substantially transverse to the side walls 109a, 109b (e.g. within plus (+) or minus (−) 10 degrees of being transverse).

In some embodiments, as best shown in, for example, FIGS. 2 and 3, the retrofit system 107 includes a retention mechanism 194 to retain a fixed position of the driver/power supply 190, 192 within the slotted openings 170, 180. As shown, the retention mechanism 194 includes a threaded fastener receptacle 194 configured to hold a threaded fastener.

FIGS. 8-13 show various other views of another embodiment of the retrofit system 107. As shown in the embodiments of FIGS. 8-13, the retention mechanism 194 has been eliminated.

FIGS. 14-17 show various other views of another embodiment of an retrofit system 107 comprising a plurality of elongated integrated holders 109, with at least one light engine 111 fastened to each integrated holder 109. The retrofit system 107 shown in FIGS. 14-17 may be particularly suited for a luminaire originally configured to house multiple fluorescent bulbs. As shown, at least two tombstone socket receptacles 116 of the plurality of tombstone socket receptacles 116 are located at one longitudinal distal end 108 of the retrofit system 107. While not shown, it should be understood that at least two tombstone socket receptacles 116 of the plurality of tombstone socket receptacles 116 may be located at both longitudinal distal ends 108 of the retrofit system 107.

As shown, at least a portion of the plurality of integrated holders 109 are spaced laterally by webs 198 that separate the plurality of integrated holders 109 from each other. As shown, the two most lateral integrated holder 109, which are shown to be substantially identical to each other (inclusive of being identical), are spaced side-by-side and extend longitudinally substantially parallel (inclusive of being parallel) to each other with a narrow, elongated web 198 there between. The retrofit system 107 thus, in some embodiments, is formed from sheet metal and, more particularly, in some embodiments, at least a portion of each of the plurality of integrated holders 109 are all formed from a single piece of sheet metal. In contrast to the earlier embodiments, the retrofit system 107, with a plurality of interconnected integrated holders 109, forms a single piece lighting pan as opposed to a lighting bar.

Figure 16:
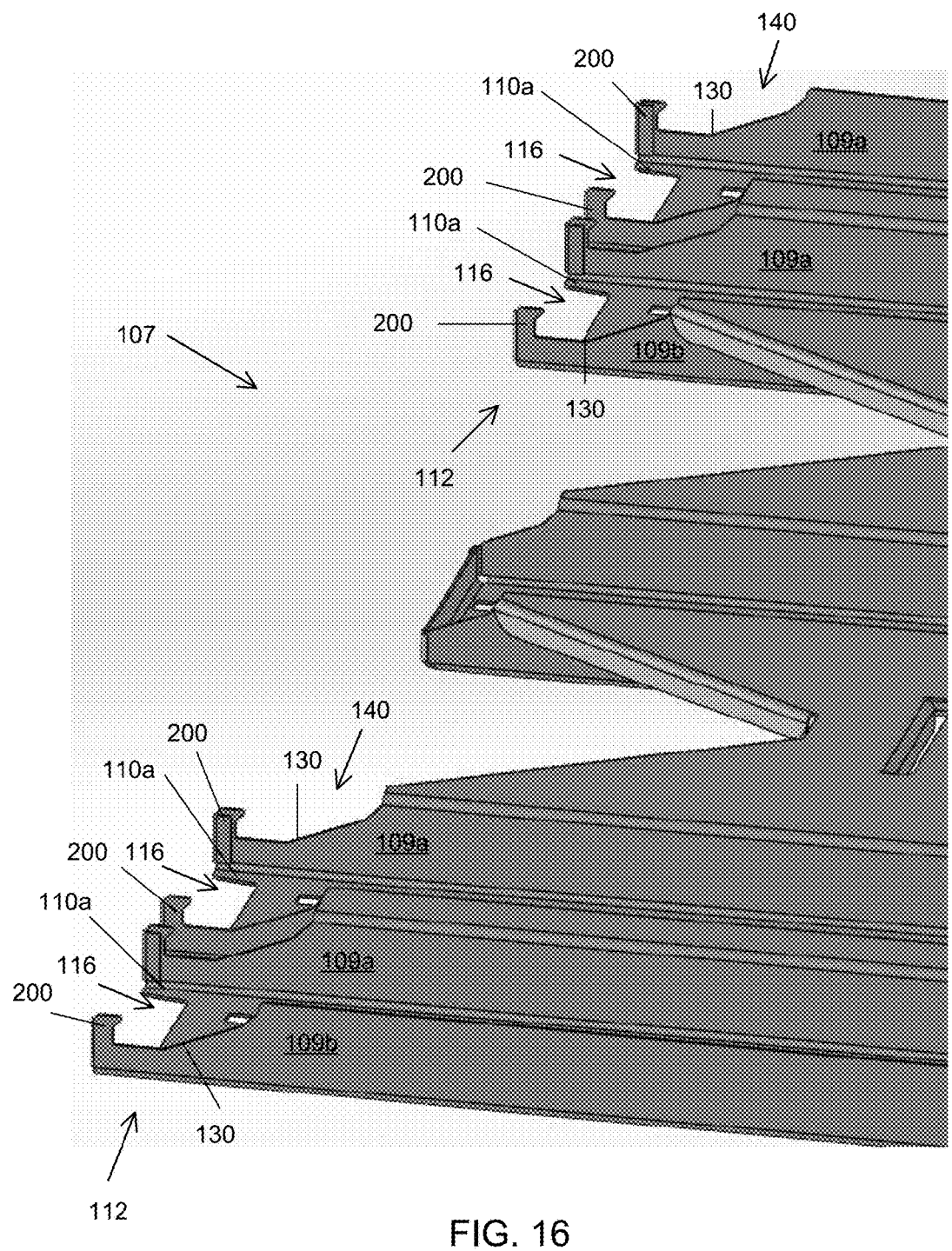
FIG. 16 shows a close-up rear perspective view of a portion of the retrofit system of FIG. 14 according to embodiments disclosed herein.
Figure 17:
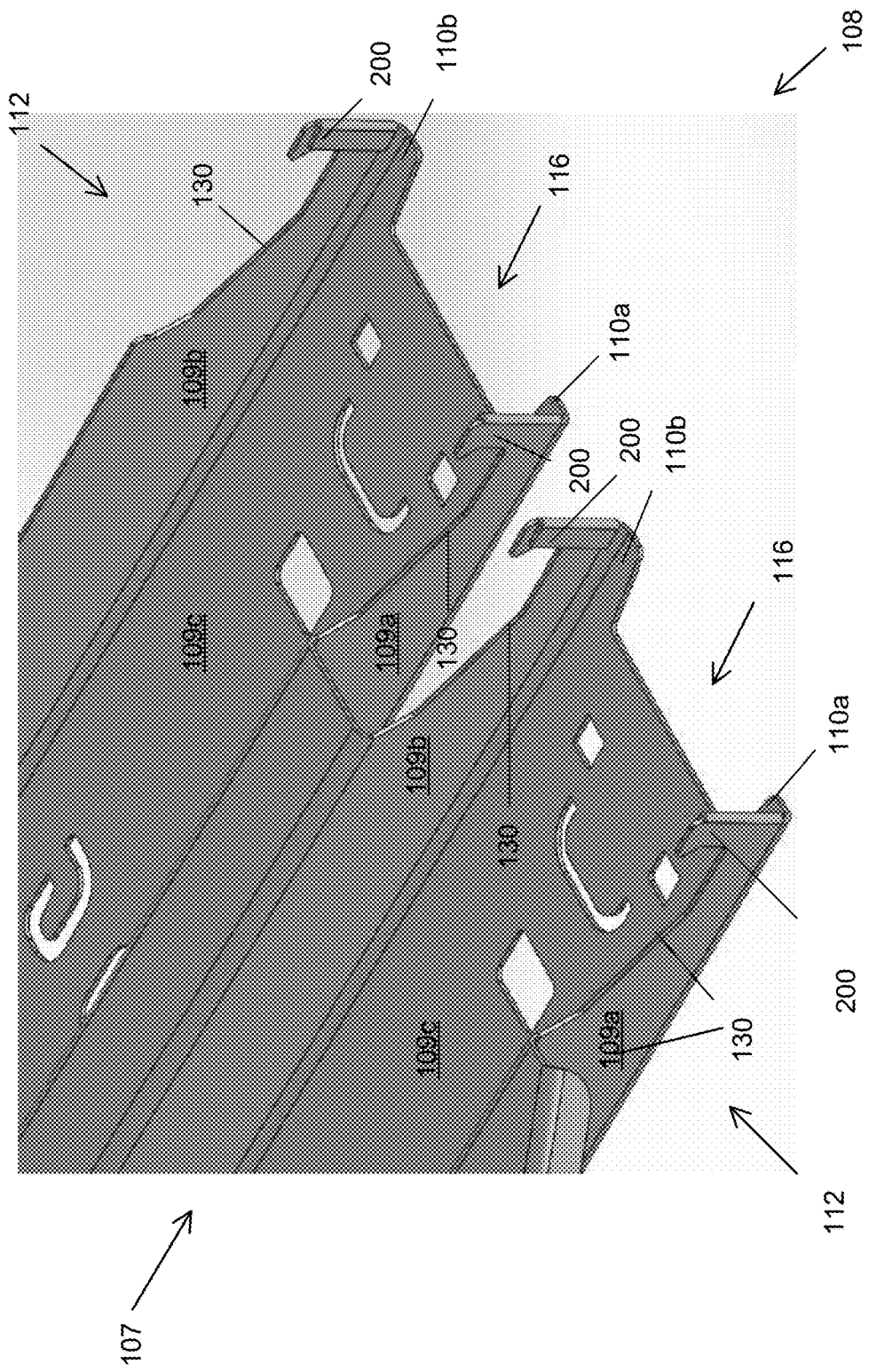
FIG. 17 shows a close-up rear perspective view of a portion of the retrofit system of FIG. 14 according to embodiments disclosed herein.

As best shown by FIGS. 16 and 17, a longitudinal distal end portion of at least one side wall 109a, 109b adjacent at least one of the first and second distal ends 108 of at least one integrated holder 109 defines a hook 200. The hook 200 is configured to hook the retrofit system 107 to the luminaire 102 and to suspend the retrofit system 107 in a vertically hanging position from the luminaire 102 during installation of the retrofit system 107 to the luminaire 102. As shown, in some embodiments, the hook 200 has the shape of a J-hook. While not illustrated in prior embodiments, it should be understood that hooks 200 are used in other embodiments of the retrofit system 107 disclosed herein.

Though embodiments of the integrated holder 109 are described as being able to hold a light engine, such as the light engine 111 shown in partial form in FIG. 1, embodiments are not so limited and thus are able to accommodate any number of light engines, depending on the length of the integrated holder 109 and the length of the light engines 111.

In some embodiments of the retrofit system 107, such as those shown in FIGS. 1-13 where the shape of the retrofit system 107 is a lighting bar as opposed to the lighting pan shown in FIGS. 14-17, a further mechanical piece is used to attach the retrofit system 107 to a luminaire (such as the luminaire 102 of FIG. 1) during installation. This further mechanical piece, referred to throughout as a support mount, functions as both a temporary support and a permanent support for the retrofit system, while also reinforcing the structure of the retrofit system. Embodiments of the support mount combine several useful features, some previously realized using distinct parts and/or feature(s) within a lighting device itself into a single part that is easily and inexpensively manufactured (for example, by molding, injection molding, extrusions, and the like). Embodiments of the support mount are made from any type of plastic, metal, and combinations thereof.

Figure 18:
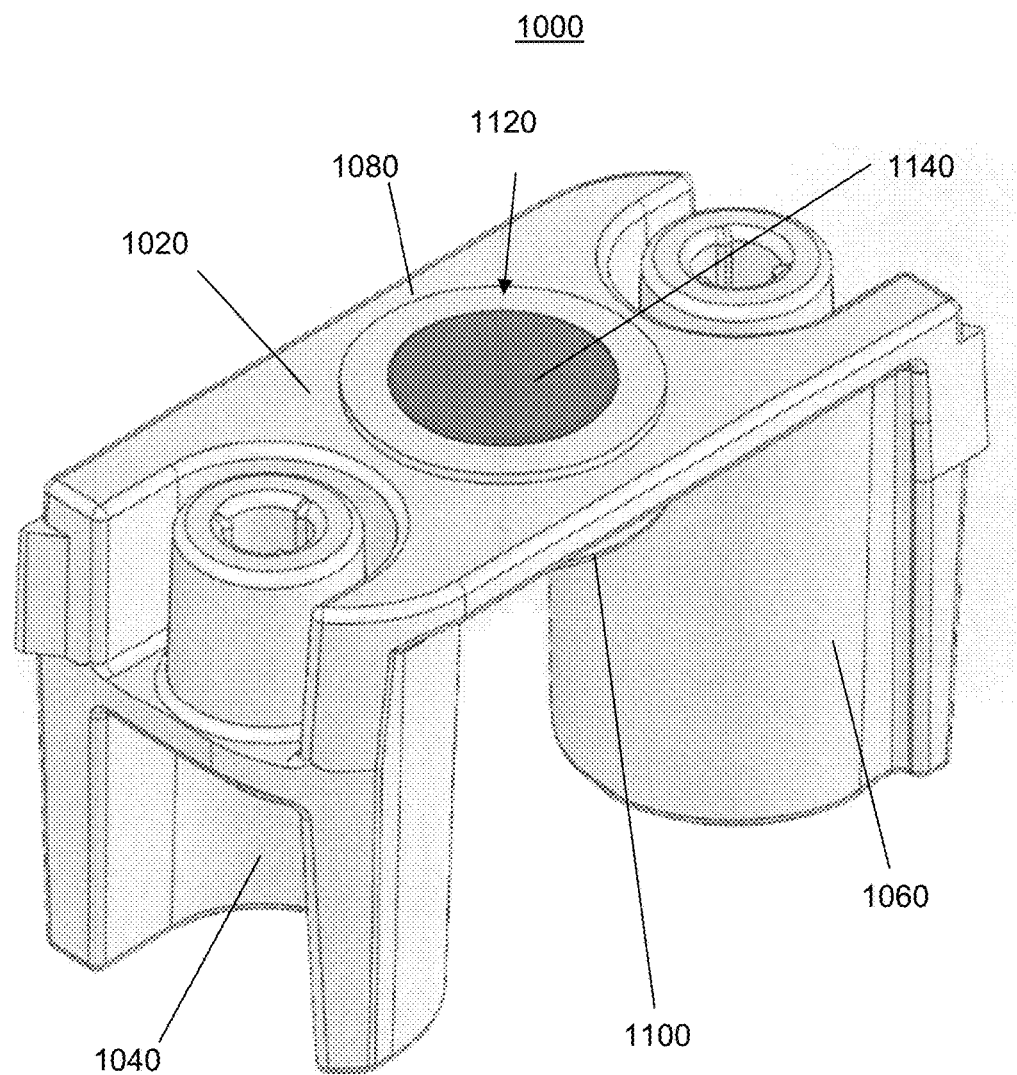
FIG. 18 shows a support mount according to embodiments disclosed herein.

FIG. 18 shows a support mount 1000. The support mount 1000 includes a base 1020, a first well 1040, and a second well 1060. The first well 1040 and the second well 1060 extend out from the base 1020 in a direction that is generally perpendicular to the base 1020, though in other embodiments is another direction. The base 1020 includes a first side 1080 and a second side 1100. The first side 1080 includes an opening 1120 (which is occupied in FIG. 18 but empty in FIGS. 19A and 18, among others). In some embodiments, the opening 1120 is a hole (that is, has no bottom), and in some embodiments, the opening 1120 is a pit (that is, has a bottom and defines a cavity). In some embodiments, a magnet 1140 is placed within the opening 1120. The magnet 1140, in some embodiments, is temporarily placed within the opening 1120, and in some embodiments, is permanently placed in the opening 1120 (for example but not limited to by being overmolded). The magnet 1140 allows for temporary attachment of the support mount 1000 to a metallic structure, such as but not limited to one made of steel, aluminum, etc. The magnet 1140 also helps to align the support mount 1000 when the support mount 1000 is placed within a channel of a retrofit system, such as but not limited to a cavity of the retrofit system 107 shown in FIGS. 2-13. In some embodiments, the magnet 1140 of the support mount 1000 allows the support mount 1000 to temporarily attach a lighting device, such as the retrofit system 107, into which the support mount 1000 is installed to another metallic surface, such as but not limited to a surface of a luminaire. This temporary attachment allows for easier installation of the lighting device, as the lighting device (for example) does not need to be held in place by hand while it is being fixedly attached to the luminaire (for example, by screws). Further, in some embodiments, the lighting device while temporarily attached via the magnet 1140 to a luminaire is movable such that the lighting device is able to be aligned, and the alignment maintained, until the lighting device is fixedly attached to the luminaire. In embodiments where the support mount 1000 is made of a metal having a strong attractive force, such as but not limited to steel, the holding force of the magnet 1140 exerted on a metallic surface to which the support mount 1000 is attached (e.g., an interior surface of a lighting device including the support mount 1000) and/or which the support mount 1000 is near (e.g., a surface of a luminaire) is correspondingly increased.

FIGS. 19A-19B show the support mount 1000 oriented in two different directions, such that in FIG. 19A the first side 1080 of the base 1020 is facing up (i.e., is visible), and in FIG. 19B the second side 1100 of the base 1020 is facing up (i.e., is at least partially visible due to the first well 1040 and the second well 1060). As is seen in FIGS. 19A and 19B, the first well 1040 and the second well 1060 each extend from the first side 1080 of the base 1020 to the second side 1100 of the base 1020. Each well 1040, 1060 is defined in part by an partial cavity 1040A, 1060A that is within a partial spherical-shaped wall 1040B, 1060B that extends upward from the second side 1100 of the base 1080. The partial spherical-shaped walls 1040B, 1060B face each other so that the partial cavities 1040A, 1060A face away from each other. At a bottom of each partial cavity 1040A, 1060A is an opening 1040C, 1060C (though the openings 1040C, 1060C are not clearly visible in FIG. 19B, due to the orientation of the support mount 1000 and the presence of screws 201, 202 in that figure, they are clearly seen in FIGS. 20A and 20B). The openings 1040C, 1060C extend through a respective cylinder 1040D, 1060D that is part of the wells 1040, 1060. In some embodiments, the cylinders 1040D, 1060D have other shapes, such as but not limited to conical shapes, pyramid shapes, and so forth. The cylinders 1040D, 1060D, in some embodiments, are joined to the base 1020, and in some embodiments, such as shown in FIGS. 19A and 19B, exist within spaces 1040E, 1060E that begin in the first side 1080 of the base 1020. The cylinders 1040D, 1060D are adapted to receive attachment devices, such as but not limited to screws 2010, 2020 shown in FIGS. 19A and 19B. The openings 1040C, 1060C, when occupied with attachment devices, allow the support mount 1000 to be fixedly attached to a first surface, such as an interior surface of a lighting device, which is itself fixedly attached via the attachment devices to a second surface, such as a housing of a luminaire.

Figure 20A:
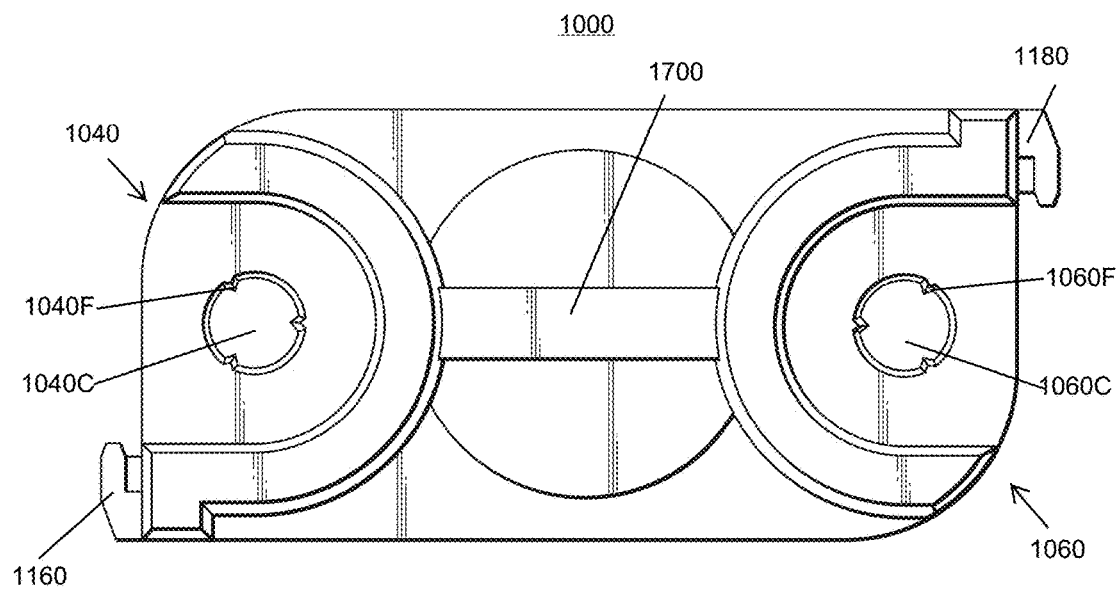
FIGS. 20A and 20B show, respectively, a top view and a bottom view of the support mount of FIG. 18 according to embodiments disclosed herein.
Figure 20B:
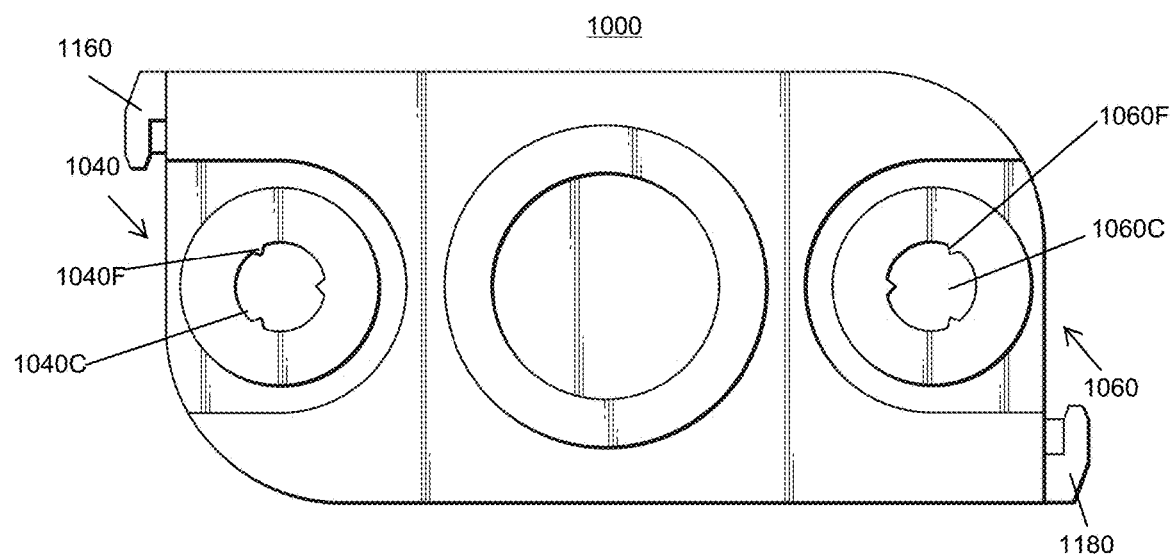

FIGS. 20A and 20B show, respectively, a top view and a bottom view of the support mount 1000. As stated above, the openings 1040C, 1060C of the first well 1040 and the second well 1060 are visible are both figures. In FIGS. 20A and 20B, the openings 1040C, 1060C each include crush ribs 1040F, 1060F. The crush ribs 1040F, 1060F are located on edges of each opening 1040C, 1060C through which attachment devices, such as the screws 2010, 2020 shown in FIGS. 19A and 19B, pass. The crush ribs 1040F, 1060F, which may and in some embodiments do take the shape of any known crushable rib-like structures, are shown in FIGS. 20A and 20B as three typical crush ribs extending laterally from an edge of the openings 1040C, 1060C towards a center of the openings 1040C, 1060C. The crush ribs 1040F, 1060F hold any attachments devices placed therein but not yet engaged with a surface of a device other than the support mount 1000, in place during packaging, storage, shipment, transport, installation, etc. When engaging an attachment device through one of the openings 1040C, 1060C, the corresponding crush ribs 1040F, 1060F easily strip away, to prevent the support mount 1000 from lifting off of the surface to which it is being fixedly attached via the attachment device.

FIGS. 20A and 20B also show a pair of clips 1160, 1180, with each clip in the pair of clips 1160, 1180 located on an opposing side of the support mount 1000. Thus, each clip 1160, 1180 is located near a well; for example, as shown in FIGS. 20A and 20B, the clip 1160 is located near the first well 1040, and the clip 1180 is located near the second well 1060. As seen in FIG. 18, the clips 1160, 1180 extend out from the base 1020 of the support mount 1000, and in some embodiments, are located beneath the partial spherical-shaped walls 1040B, 1060B of the first well 1040 and the second 1060. The clips 1160, 1180 snap and/or slide into a corresponding opening(s) in a channel of a lighting device so as to help hold the support mount 1000 in place within the channel of the lighting device, as well as to help prevent the channel from moving apart and/or collapsing when under stress.

FIGS. 21A-21C each show a portion of an example lighting device 4000, such as a portion of the retrofit system 107 shown above, into which the support mount 1000 is mounted, with a close up view of the support mount 1000 with the pair of clips 1160, 1180 being engaged into a channel 4100 of the lighting device 4000. The lighting device 4000 includes at least one channel 4100. The at least one channel 4100 is defined by having at least two edges, which form an opening into which the support mount 1000 is placed. The lighting device 4000 includes at least one hole 4180 through which an attachment device is able to pass. In some embodiments, the attachment device is the same attachment device (e.g., the screws 2010, 2020) that passes through the support mount 1000. In some embodiments, a first attachment device passes through one hole of the lighting device 4000 and the support mount 1000, and a second attachment decide passes through another hole of the lighting device 4000 and the support mount 1000. In some embodiments, the lighting device 4000 includes a protrusion that extends at least partially into the channel 4100.

In some embodiments, the channel 4100 of the lighting device 4000 is used to contain a power supply and/or control components for a light engine including one or more solid state light sources (all not shown). In some embodiments, one or more control components, such as but not limited to a daylight sensor, an occupancy sensor, and the like (not shown), are attached between the first well 1040 and the second well 1060, adding further functionality to the lighting device 4000. In some embodiments, such as shown in FIG. 22, a support mount 1000A includes a wire channel 1500A that is able to accommodate one or more cables needed by the lighting device 4000 and/or any of its components.

In FIG. 21A, the support mount 1000 is moved into place within the channel 4100. In FIG. 21B, the support mount 1000 is partially rotated, such that the first side 1080 begins to engage with the channel 4100. In FIG. 21C, the support mount 1000 is in position within the channel 4100, such that the clips 1160, 1180 engage the channel 4100 (for example but not limited to in corresponding receiving openings of the channel 4100), and such that the openings 1040C, 1060C of the support mount 1000 are aligned with the holes 4180 of the channel 4100, allowing one or more attachment devices (not shown in FIGS. 21A-21C) to further engage the support mount 1000 to the lighting device 4000.

Figure 22:
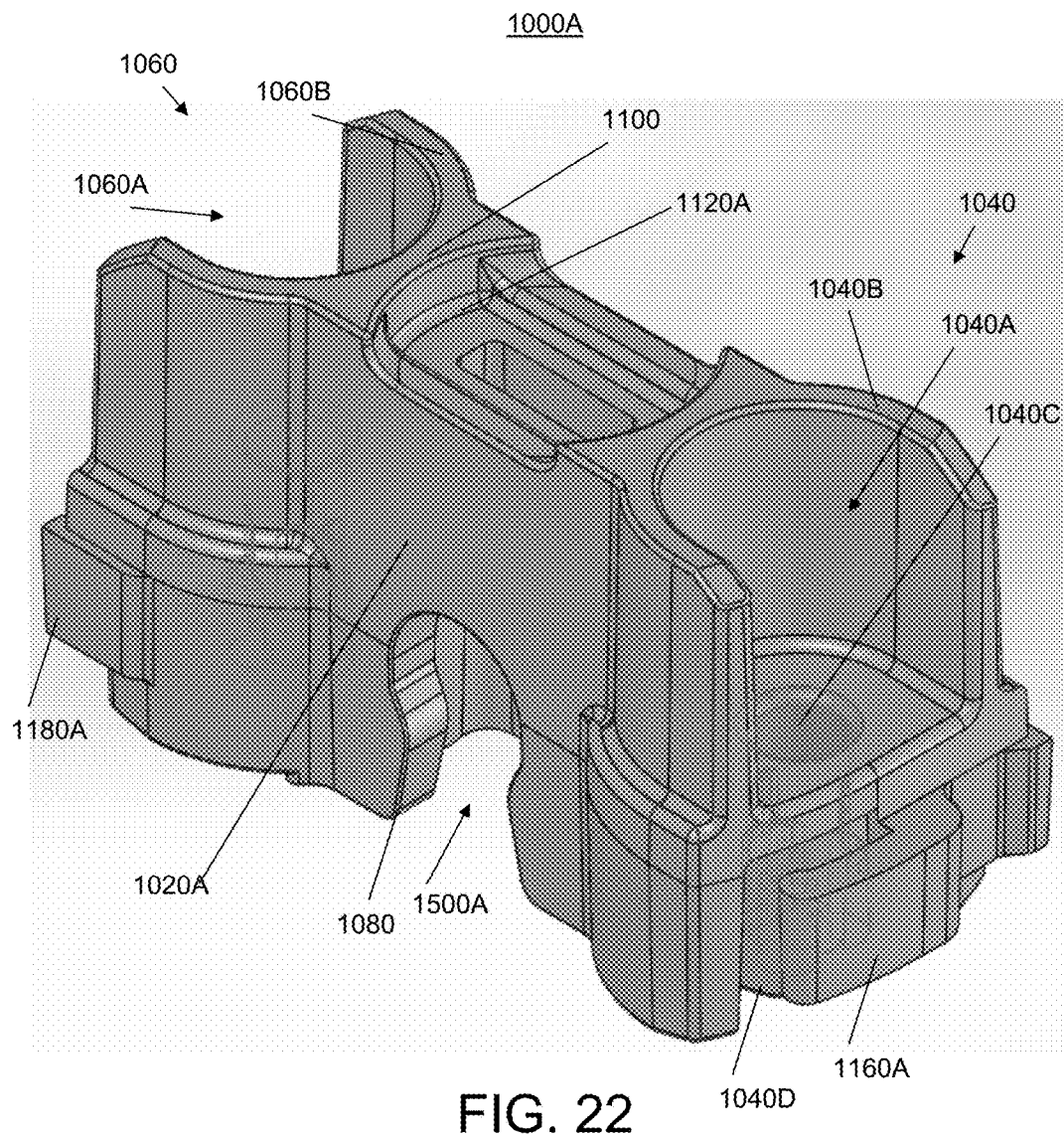
FIG. 22 shows another embodiment of a support mount, according to embodiments disclosed herein.
Figure 23:
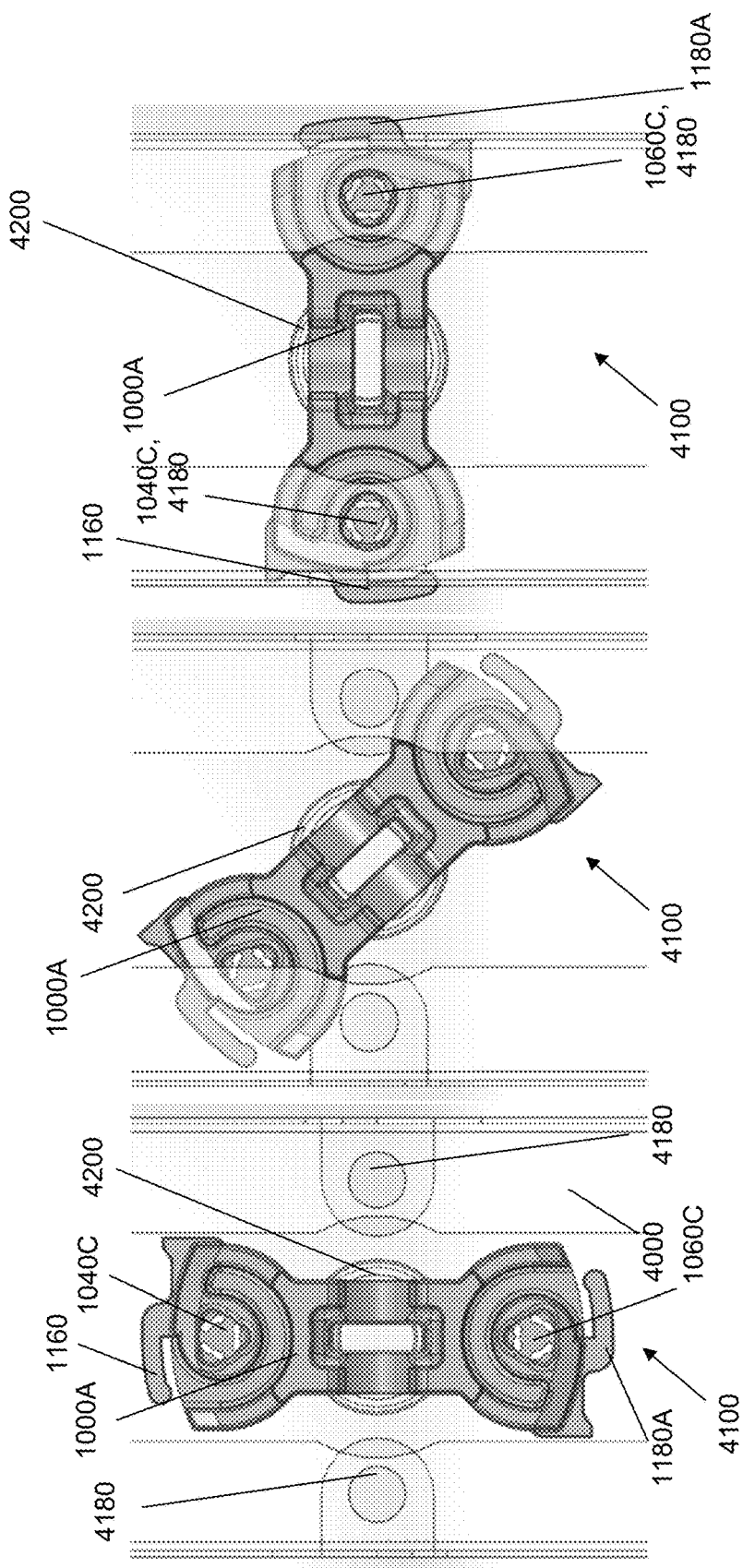
FIGS. 23A-23C show the support mount of FIG. 22 being placed into a portion of the retrofit system of FIGS. 1-13, according to embodiments disclosed herein.
Figure 24:
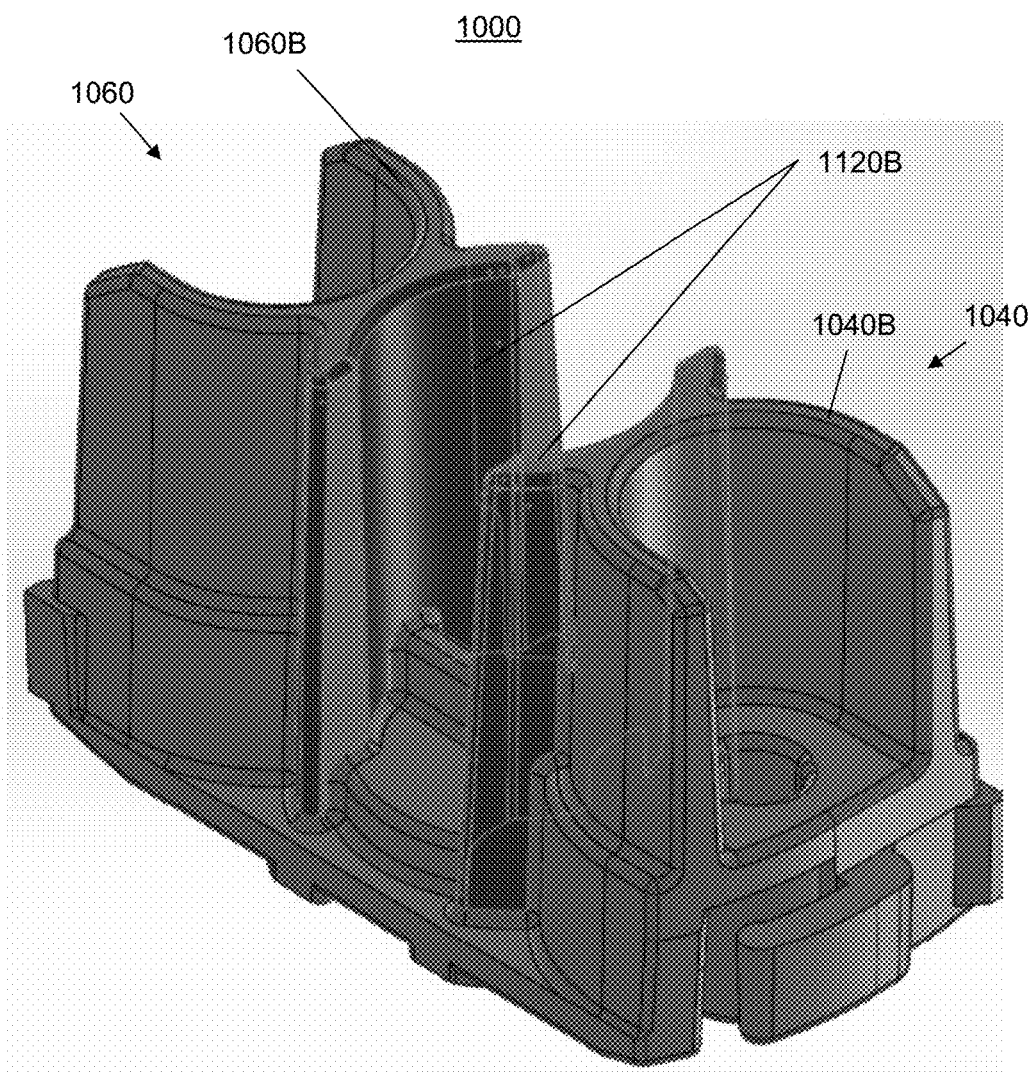
FIG. 24 shows an embodiment of the support mount of FIG. 18 including a receiving feature, according to embodiments disclosed herein.

FIG. 22 shows an alternate embodiment of a support mount 1000A. The support mount 1000A includes a base 1020A, a first well 1040, and a second well 1060, and is similar in some regards to the support mount 1000 of FIG. 18. Thus, the first well 1040 and the second well 1060 of the support mount 1000A each extend from a first side 1080 of the base 1020A to a second side 1100 of the base 102A. Each well 1040, 1060 is defined in part by a partial cavity 1040A, 1060A that is within a partial spherical-shaped wall 1040B, 1060B. The partial spherical-shaped walls 1040B, 1060B face each other so that the partial cavities 1040A, 1060A face away from each other. At a bottom of each partial cavity 1040A, 1060A is an opening 1040C, 1060C (though the opening 1060C is not clearly visible in FIG. 22, due to the orientation of the support mount 1000A, it is clearly seen in FIGS. 23A-23C, among others). The openings 1040C, 1060C extend through a respective cylinder 1040D, 1060D (though the cylinder 1060D is not shown in FIG. 22 due to orientation of the support mount 1000A but is shown in FIGS. 23A-23C, among others) that is part of the wells 1040, 1060, is attached to the base 1020A, and are adapted to receive attachment devices. The support mount 1000A also includes a pair of clips 1160A, 1180A (though only part of the clip 1180A is visible in FIG. 22 due to the orientation of the view, the clip 1180A is shown in FIG. 24 among others).

In contrast to the support mount 1000 of FIG. 18, the base 1020A of the support mount 1000A extends between the first well 1040 and the second well 1060, more particularly between the partial spherical-shaped wall 1040B of the first well 1040 and the partial spherical-shaped wall 1060B of the second well 1060. Further, the clips 1160A, 1180A extend further along the wells 1040, 1060, so as to at least partially obscure the cylinders 104D, 106D. There are other features of the support mount 1000A, such as an opening 1120A that is capable of including a magnet (not shown) and a wire channel 1500A, that are described in greater detail below.

FIGS. 23A-23C show the support mount 1000A with the pair of clips 1160A, 1180A being engaged into the channel 4100 of the lighting device 4000. In FIGS. 23A-23C, the channel 4100 of the lighting device 4000 includes the protrusion 4200 that mates with a matching receiving feature 1120A on the support mount 1000A. The receiving feature 1120A of the support mount 1000A is shown in FIG. 22, and is, in some embodiments, capable of alternatively and/or additionally receiving a magnet (not shown). In some embodiments, the support mount 1000 of FIG. 18 also includes a matching receiving feature 1120B, as shown in FIG. 24, which is formed along and/or attached to the partial spherical-shaped walls 1040B, 1060B of the wells 1040, 1060. In FIG. 23A, the support mount 1000A is moved into place within the channel 4100 and the receiving feature 1120A engages the protrusion 4200. In FIG. 23B, the support mount 1000A is partially rotated, such that the first side 1080 begins to engage with the channel 4100, with the protrusion 4200 and the receiving feature 1120A aiding in the rotation. In FIG. 23C, the support mount 1000A is in position within the channel 4100, such that the clips 1160A, 1180A engage the channel 4100 (for example but not limited to in corresponding receiving openings of the channel 4100), and such that the openings 1040C, 1060C of the support mount 1000A are aligned with the holes 4180 of the channel 4100, allowing one or more attachment devices (not shown in FIGS. 21A-21C) to further engage the support mount 1000 to the lighting device 4000. The receiving feature 1120A continues to engage the protrusion 4200, providing further support and stability.

Figure 25:
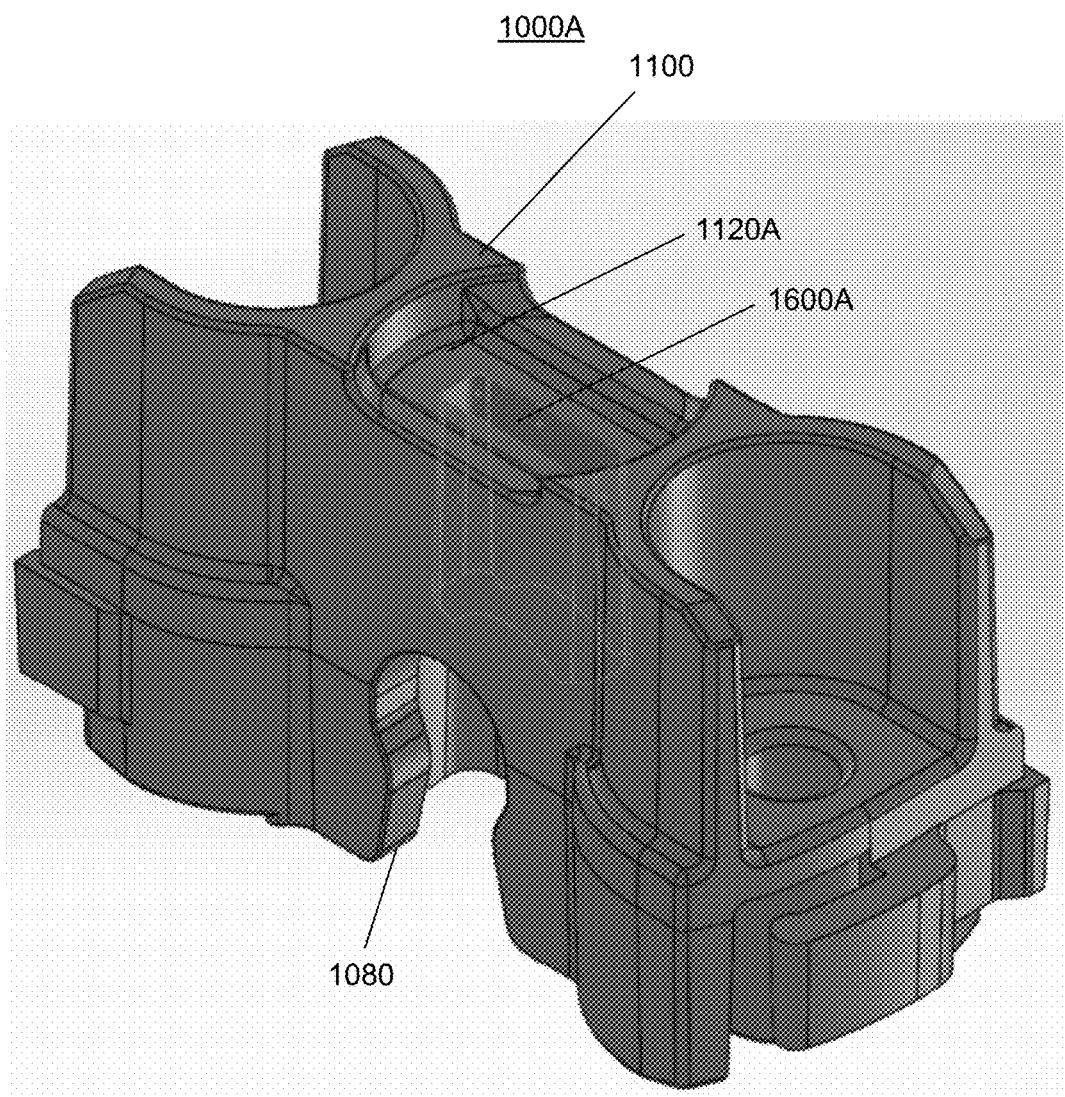
FIG. 25 shows an embodiment of the support mount of FIG. 22 including an insertion feature, according to embodiments disclosed herein.
Figure 26:
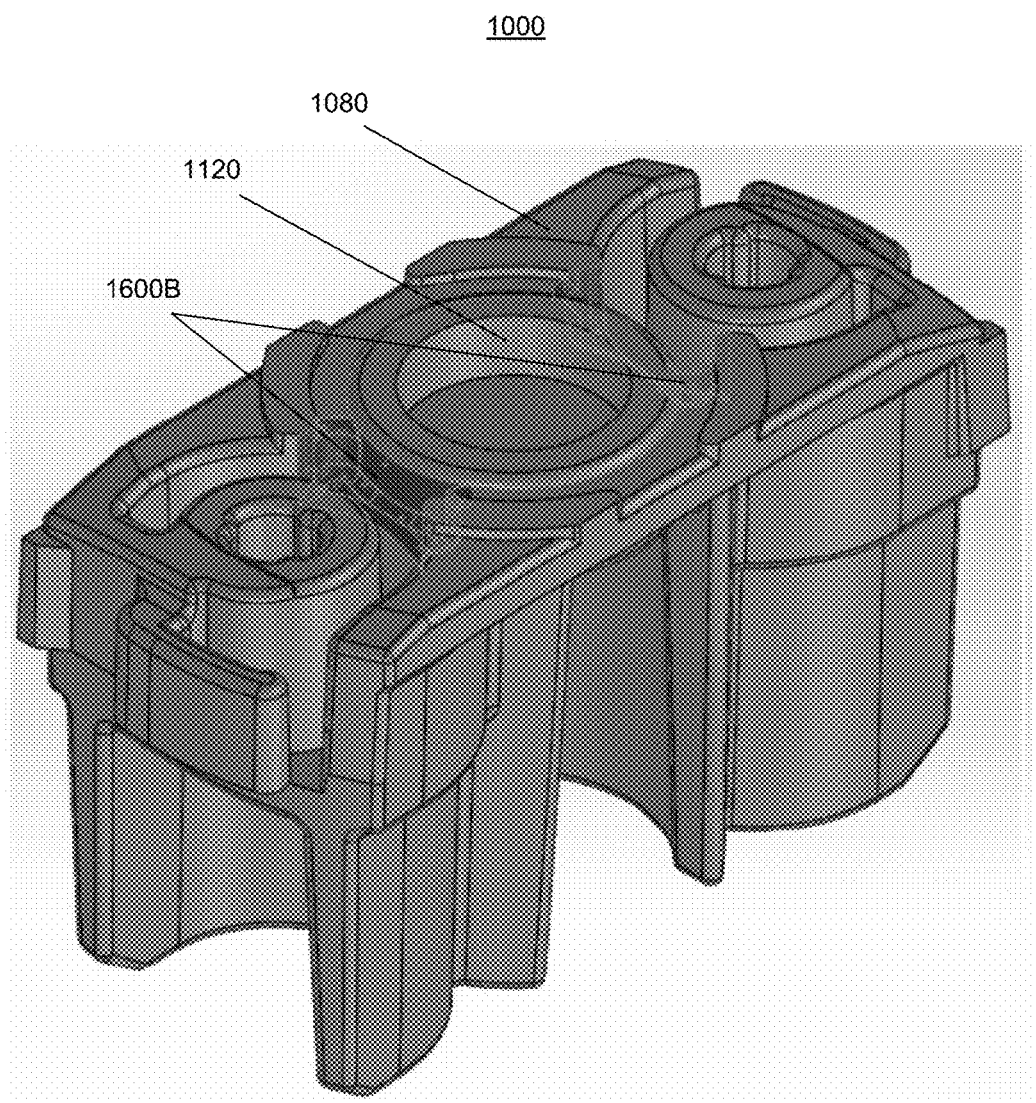
FIG. 26 shows an embodiment of the support mount of FIG. 18 including an insertion feature, according to embodiments disclosed herein.

To assist in moving embodiments of the support mount that include the receiving feature in relation to the protrusion 4200, thus taking advantage of the receiving feature, some embodiments of the support mount include an insertion feature. For example, FIG. 25 shows the support mount 1000A including an insertion feature 1600A, which allows for insertion of a tool (e.g., a slotted screwdriver). The insertion feature 1600A receives the tool, and the tool allows the support mount 1000A to be moved (e.g., rotated) into place when the receiving feature 1120A is mated with the protrusion 4200. The insertion feature 1600A, in some embodiments and as shown in FIG. 25, extends from the first side 1080 of the support mount 1000A to the second side of the support mount 1000A, though in some embodiments, it does not extend all the way through to the second side 1100. In some embodiments, the insertion feature 1600A does not extend from the first side 1080 to the second side 1100 at all. For example, as shown in FIG. 26, the support mount 1000 includes an insertion feature 1600B that is located adjacent to portions of the opening 1120 on the first side 1080.

Returning to FIG. 20A, the support mount 1000, in some embodiments, also includes a brace 1700, located between the first well 1040 and the second well 1060. The brace 1700 assists in providing structural support to the first well 1040 and the second well 1040 if the support mount 1000 is squeezed together, such as may occur when the support mount 1000 is mounted within a channel of a lighting device, such as shown in FIGS. 21A-21C.

Figure 27:
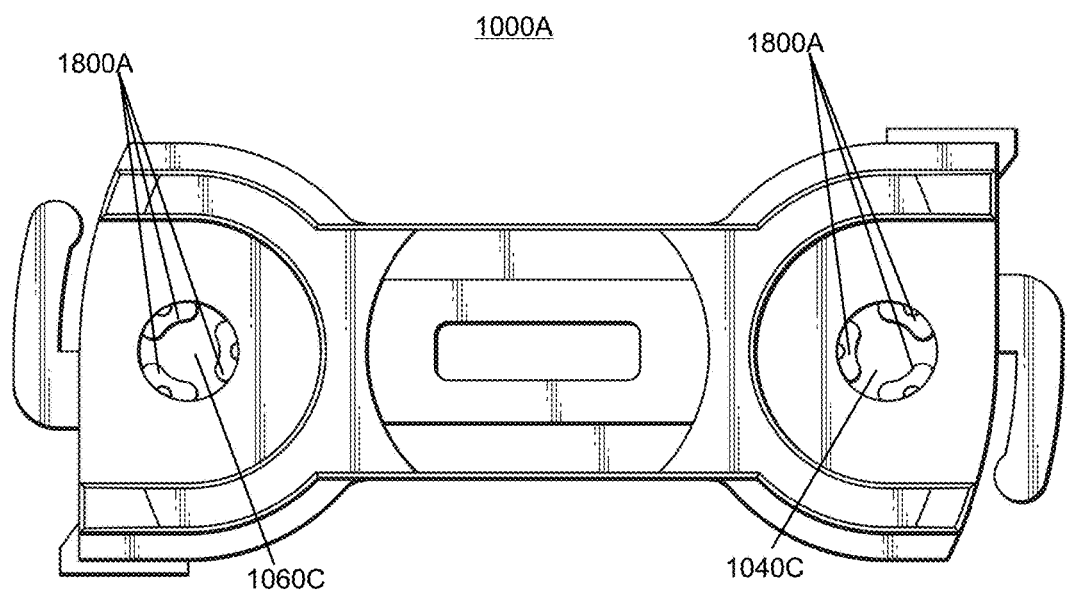
FIG. 27 shows an embodiments of the support mount of FIG. 22 including a thin film, according to embodiments disclosed herein.

In some embodiments, such as shown in FIG. 27, the openings 1040C, 1060C of the support mount 1000A include a thin film 1800A that indicates that an attachment device, such as but not limited to a screw, bolt, and the like, has been inserted to the proper depth during installation of the support mount 1000A. In some embodiments, the support mount 1000 (not shown) includes a similar thin film 1800.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A retrofit system for a luminaire, said luminaire including a tombstone socket, said retrofit system comprising:
an integrated holder, configured to hold a power supply;
a solid state engine disposed on the integrated holder and configured to be powered by the power supply; and
a tombstone socket receptacle configured to selectively and detachably interface with the tombstone socket of the luminaire,
wherein said retrofit system is devoid of a tombstone socket and forms an integral unit selectively detachable from said luminaire.

2. The retrofit system of claim 1, further comprising a support mount (1000) disposed on the integrated holder at a location spaced from the tombstone socket receptacle, said support mount comprising a fastener, whereby the integrated holder is securable by the support mount to the luminaire.

3. In combination the retrofit system of claim 1 and the luminaire, wherein
the tombstone socket (104) of the luminaire has a tombstone face (105a) defining a bi-pin receiving aperture; and
the tombstone socket receptacle is received in abutting relation to the tombstone socket, wherein the tombstone socket receptacle is not received into the bi-pin receiving aperture,
whereby there is no electrical pathway established between the tombstone socket and the retrofit system.

4. The retrofit system of claim 1, further comprising:
a power supply to power the solid state light engine,
wherein the tombstone socket receptacle is electrically isolated from an electrical pathway supplying the solid state light engine.

5. The retrofit system of claim 1, wherein the integrated holder comprises an elongated structure.

6. The retrofit system of claim 5, wherein the integrated holder comprises opposing first and second longitudinal distal ends, wherein the opposing first and second longitudinal distal ends are on opposing ends of the elongated structure, and wherein the tombstone socket receptacle is located at the first longitudinal distal end.

7. The retrofit system of claim 5, wherein the retrofit system further comprises a light engine comprising an elongated shape and a plurality of solid state light sources arranged thereon, wherein the light engine is fastened to the elongated structure of the integrated holder such that the elongated shape of the light engine corresponds to the elongated structure of the integrated holder.

8. The retrofit system of claim 5, wherein the elongated structure comprises a three-dimensional profile extending along a longitudinal length of the elongated structure, wherein the three-dimensional profile defines a cavity in the elongated structure, and wherein the cavity holds a power supply.

9. The retrofit system of claim 5, wherein the integrated holder comprises opposing first and second longitudinal distal ends; and
wherein the elongated structure comprises:
a three-dimensional profile extending along a longitudinal length of the elongated structure;
two laterally spaced sides walls, each comprising a longitudinal distal end portion adjacent at least one of the first longitudinal distal end and the second longitudinal distal end of the elongated structure and defining a notch in the side wall; and
a front wall disposed between the two laterally spaced side walls.

10. The retrofit system of claim 9, wherein each side wall has a height, and wherein each notch is defined by a decrease in a height of the side wall relative to an adjacent medial portion of each side wall.

11. The retrofit system of claim 9, wherein the three-dimensional profile comprises a U-shaped profile.

12. The retrofit system of claim 9, wherein a longitudinal distal end portion of at least one side wall adjacent at least one of the first longitudinal distal end and the second longitudinal distal end of the elongated structure defines a hook.

13. The retrofit system of claim 12, wherein the hook is configured to hook the retrofit system to the luminaire and to suspend the retrofit system in a vertically hanging position from the luminaire during installation of the retrofit system to the luminaire.

14. The retrofit system of claim 12, wherein the hook is in the form of a J-hook.

15. The retrofit system of claim 1, wherein the integrated holder comprises opposing first and second longitudinal distal ends, the tombstone socket receptacle is located at the first longitudinal distal end of the integrated holder.

16. The retrofit system of claim 2, wherein the integrated holder comprises a generally planar central region (109c) configured to hold a solid state light engine, and the tombstone socket receptacle extends away from the central region and substantially parallel thereto.

17. The retrofit system of claim 15, wherein the tombstone socket receptacle comprises two protrusions located at the first longitudinal distal end of the integrated holder, wherein the two protrusions are shaped so as to accommodate the tombstone socket of the luminaire.

18. The retrofit system of claim 3, wherein the two protrusions (110a, 110b) are connected by a bight portion in a U-shape, the bight portion defined by a lateral front wall portion (109c) of the integrated holder (109).

19. The retrofit system of claim 15, further comprising a plurality of light engines, each comprising an elongated shape and a plurality of solid state light sources arranged thereon; and
wherein the integrated holder comprises a plurality of elongated structures and each one of the plurality of solid state light engines is arranged on a different one of the plurality of elongated structures.

20. The retrofit system of claim 19, wherein the plurality of elongated structures are spaced side-by-side by an elongated gap that separates the plurality of elongated structures from each other.

21. The retrofit system of claim15, wherein the tombstone socket receptacle comprises a plurality of tombstone socket receptacles.

22. The retrofit system of claim 21, wherein at least two tombstone socket receptacles of the plurality of tombstone socket receptacles are located at the first longitudinal distal end of the integrated holder.

23. The retrofit system of claim 21, wherein a tombstone socket receptacle of the plurality of tombstone socket receptacles is located at the second longitudinal distal end of the integrated holder.

24. The retrofit system of claim 23, wherein at least two tombstone socket receptacles of the plurality of tombstone socket receptacles are located at the second longitudinal distal end of the integrated holder.

25. A combination comprising:
a luminaire and a retrofit system (107) for the luminaire, the luminaire (102) including a tombstone socket directly affixed to the luminaire, the tombstone socket having a tombstone face defining a bi-pin receiving aperture; and
a retrofit system devoid of a tombstone socket and comprising an integrated holder configured to hold a solid state light engine and a power supply to power the solid state light engine, and a tombstone socket receptacle configured to selectively and detachably interface with the tombstone socket of the luminaires;
wherein the tombstone socket receptacle is received in abutting relation to the tombstone socket and selectively detachable from the tombstone socket, wherein the tombstone socket receptacle is not received into the bi-pin receiving aperture; whereby said retrofit system forms an integral unit selectively detachable from said luminaire.

26. The combination of claim 25, wherein the tombstone socket receptacle (116) received in the abutting relation to the tombstone socket (104) remains electrically isolated from the tombstone socket.

27. The combination of claim 25, wherein the tombstone socket receptacle (116) is electrically isolated from an electrical pathway configured to supply power to the solid state light engine.

28. The combination of claim 25, wherein the luminaire (102) further comprises two mutually facing tombstone sockets (104) and the retrofit system (107) further comprises two tombstone socket receptacles (116) disposed at opposing ends thereof, and the tombstone socket receptacles (116) being removable by simultaneous translational displacement from the abutting relation to the two mutually facing tombstone sockets (104).

29. A method of mounting a retrofit lighting system in a conventional luminaire for a fluorescent lamp having conductive bi-pins, the conventional luminaire comprising a tombstone socket having an outermost lateral peripheral surface bounding transverse to said lateral peripheral surface a tombstone face defining a bi-pin receiving aperture for electrically conductive bi-pins of the fluorescent lamp, comprising:
providing an integrated holder formed at a distal end thereof with a tombstone socket-receiving receptacle configured to receive the tombstone socket of the luminaire, wherein the integrated holder further comprises a solid state light engine and a power supply to power the solid state light engine;
translating the integrated holder towards the luminaire; and
aligning, while translating the integrated holder, the integrated holder in the luminaire with the tombstone socket-receiving receptacle in surrounding relation to the lateral peripheral surface of the tombstone socket, said positioning further comprising leaving the bi-pin receiving aperture on the tombstone face of the tombstone socket unoccupied.

30. The method of claim 29, further comprising
disposing on the integrated holder, spaced from the tombstone socket-receiving receptacle, a support mount, said support mount comprising a fastener; and
securing via the support mount the integrated holder to the luminaire.

31. The method of claim 29, further comprising
fixedly attaching, at a location spaced from the tombstone socket-receiving receptacle, the integrated holder to the luminaire.

32. The method of claim 31, wherein said fixedly attaching comprises screwing.

* * * * *